US011912033B2

(12) United States Patent
Takahashi et al.

(10) Patent No.: US 11,912,033 B2
(45) Date of Patent: Feb. 27, 2024

(54) LINE HEAD ASSEMBLY, PRINTING APPARATUS PROVIDED WITH LINE HEAD ASSEMBLY, AND METHOD OF FLOWING LIQUID IN LINE HEAD ASSEMBLY

(71) Applicant: BROTHER KOGYO KABUSHIKI KAISHA, Nagoya (JP)

(72) Inventors: Yuki Takahashi, Nagoya (JP); Hirotoshi Ishizaki, Nagakute (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 5 days.

(21) Appl. No.: 17/698,238

(22) Filed: Mar. 18, 2022

(65) Prior Publication Data

US 2022/0314622 A1 Oct. 6, 2022

(30) Foreign Application Priority Data

Mar. 30, 2021 (JP) ................................ 2021-057462

(51) Int. Cl.
*B41J 2/155* (2006.01)
*B41J 2/175* (2006.01)

(52) U.S. Cl.
CPC .................................... *B41J 2/155* (2013.01)

(58) Field of Classification Search
CPC .................................. B41J 2/155; B41J 2/175
See application file for complete search history.

(56) References Cited

U.S. PATENT DOCUMENTS

| | | | |
|---|---|---|---|
| 2012/0218355 A1 | 8/2012 | Suzuki et al. | |
| 2015/0077473 A1 | 3/2015 | Wanibe et al. | |
| 2016/0271945 A1 | 9/2016 | Togashi et al. | |
| 2016/0288499 A1* | 10/2016 | Sugahara | B41J 2/18 |
| 2017/0021613 A1 | 1/2017 | Hanagami et al. | |
| 2017/0282558 A1 | 10/2017 | Miyajima | |
| 2018/0215167 A1 | 8/2018 | Brandenberger et al. | |

FOREIGN PATENT DOCUMENTS

| | | |
|---|---|---|
| EP | 3162572 A1 | 5/2017 |
| EP | 3461641 A1 | 4/2019 |
| JP | 2007-90693 A | 4/2007 |

(Continued)

OTHER PUBLICATIONS

Extended European Search Report issued in corresponding European Patent Application No. 22162104.8, dated Aug. 1, 2022.

(Continued)

*Primary Examiner* — Jason S Uhlenhake
(74) *Attorney, Agent, or Firm* — Merchant & Gould P.C.

(57) ABSTRACT

There is provided a line head assembly including: a line head having a first head, a second head and a third head arranged in a first direction, a tank positioned at a location above the line head. Each of the first head, the second head and the third head includes a first intra-head channel including a first pressure chamber and a first nozzle, a first supply port, and a first discharge port. The tank includes: a first supply channel connected to the first supply port of the first head, the first supply port of the second head and the first supply port of the third head, and a first discharge channel connected to the first discharge port of the first head, the first discharge port of the second head and the first discharge port of the third head.

23 Claims, 15 Drawing Sheets

(56) References Cited

FOREIGN PATENT DOCUMENTS

| | | | |
|---|---|---|---|
| JP | 2010-214819 | A | 9/2010 |
| JP | 2015-214130 | A | 12/2015 |
| JP | 2016-175280 | A | 10/2016 |
| JP | 2017-24322 | A | 2/2017 |
| JP | 2017-177442 | A | 10/2017 |

OTHER PUBLICATIONS

Extended European Search Report issued in corresponding European Patent Application No. 22164493.3, dated Aug. 19, 2022.

* cited by examiner

CROSS SECTION A

CROSS SECTION C

CROSS SECTION B

CROSS SECTION D

LINE HEAD ASSEMBLY, PRINTING APPARATUS PROVIDED WITH LINE HEAD ASSEMBLY, AND METHOD OF FLOWING LIQUID IN LINE HEAD ASSEMBLY

CROSS REFERENCE TO RELATED APPLICATION

The present application claims priority from Japanese Patent Application No. 2021-057462, filed on Mar. 30, 2021, the disclosure of which is incorporated herein by reference in its entirety.

BACKGROUND

The present disclosure relates to a line head assembly having a plurality of heads of a circulating type which are arranged in a staggered manner, a printing apparatus provided with the same, and a method of flowing a liquid in a line head assembly.

A certain publicly known printing apparatus is provided with a line head having two head rows (a first head row and a second head row), and two tanks (a first tank and a second tank) corresponding to the two head rows, respectively. The first head row and the second head row are arranged to be shifted from each other in an extending direction of the head rows. With this, a plurality of heads included in the two head rows are arranged, as a whole, in a staggered manner. Further, each of the plurality of heads has two nozzle rows (a first nozzle row and a second nozzle row). The inside of each of the two tanks is divided into a first ink chamber and a second ink chamber corresponding to the first nozzle row and the second nozzle row, respectively.

The first tank is arranged at a location above the first head row. Further, the first ink chamber of the first tank is located at a location above the first nozzle row of each of heads, among the plurality of heads, which are included in the first head row. Furthermore, the second ink chamber of the first tank is located at a location above the second nozzle row of each of the heads, among the plurality of heads, which are included in the first head row. This is similarly applicable also to the second tank. With this, ink supply channels each of which connects one of the four ink chambers and one of the four nozzle rows can be easily formed, thereby making it possible to supply an ink individually to each of the four nozzle rows included in the first and second head rows.

SUMMARY

In the recent years, a head of a circulating type is adopted for stabilizing the state of the ink, in some cases. With respect to this, in the publicly known printing apparatus as described above, the plurality of heads arranged in the staggered manner are not head of the circulating type.

An object of the present disclosure is to provide a technique of distributing and collecting (recovering) a liquid, such as an ink, etc., appropriately with respect to each of head rows in a line head in which a plurality of heads of the circulating type are arranged in the staggered manner.

According to an aspect of the present disclosure, there is provided a line head assembly including: a line head and a tank. The line head includes a first head, a second head and a third head arranged in a first direction. The second head is arranged between the first head and the third head in the first direction. Positions, in a second direction crossing the first direction, of the first head and the third head are same, and the positions of the first head and the third head in the second direction are different from a position in the second direction of the second head. The tank is located above the line head in an up-down direction crossing the first direction and the second direction. Each of the first head, the second head and the third head includes: a first intra-head channel including a first pressure chamber and a first nozzle; a first supply port connected to one end of the first intra-head channel; and a first discharge port connected to the other end of the first intra-head channel. The tank includes: a first supply channel connected to the first supply port of the first head, the first supply port of the second head and the first supply port of the third head; and a first discharge channel connected to the first discharge port of the first head, the first discharge port of the second head and the first discharge port of the third head.

In the above-described configuration, the first to third heads of the line head are arranged in the staggered manner. Further, the tank arranged at the location above the line head has the first supply channel connected to the first supply port of each of the first to third heads, and the first discharge channel connected to the discharge port of each of the first to third heads. With this, it is possible to supply the liquid from the first supply channel to the first supply port of each of the first to third heads, and to recover (collect) the liquid from the first discharge port of each of the first to third heads to the first discharge channel. With this, it is possible to easily realize a head of the circulating type.

DETAILED DESCRIPTION

Figure 1:
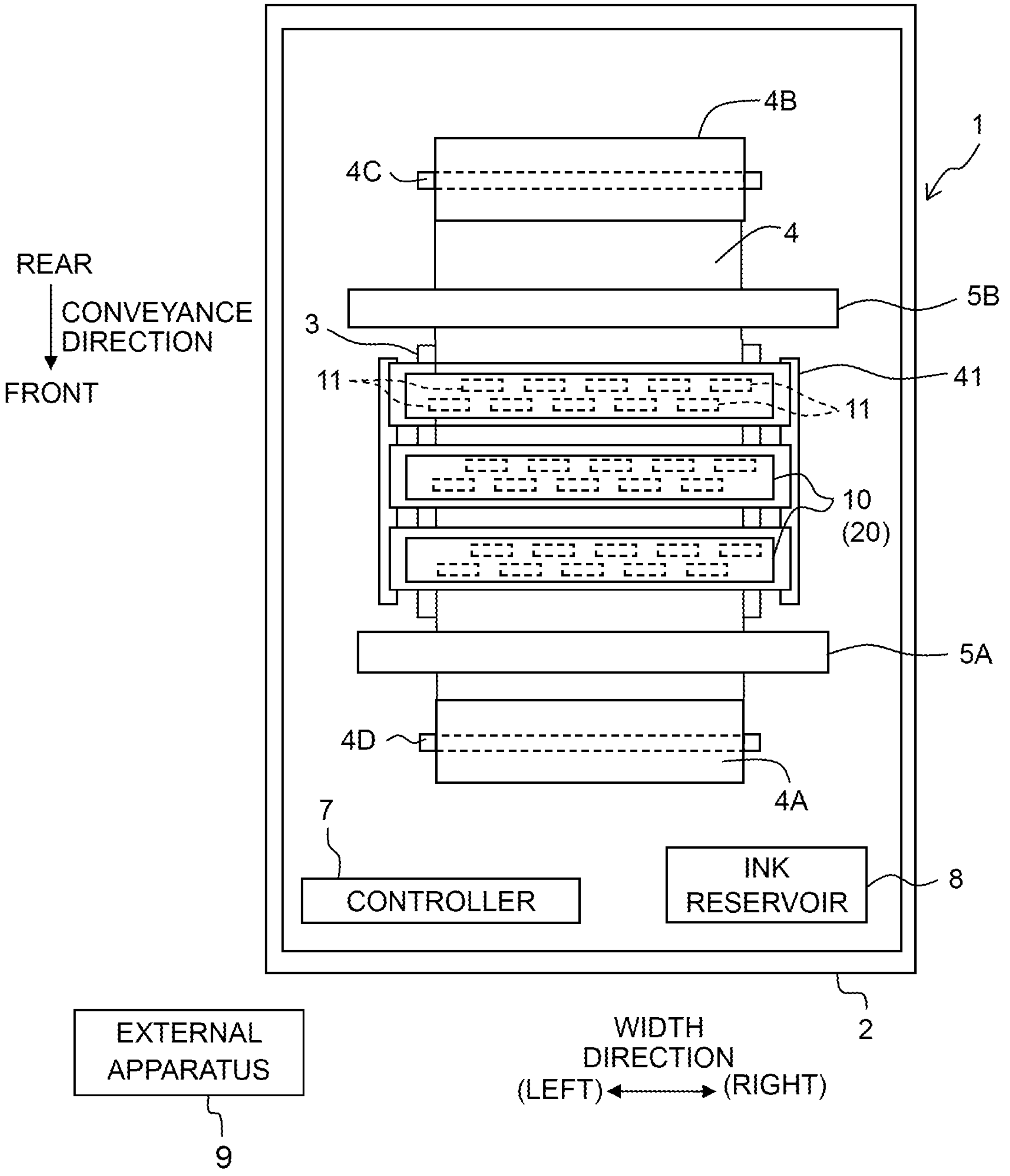
FIG. 1 is a schematic plan view of a printing apparatus 1.

In the following, a printing apparatus 1 according to an embodiment of the present disclosure will be explained, based on the drawings. In FIG. 1, a conveying direction of a recording medium 4 corresponds to a front-rear direction of the printing apparatus 1. Further, a width direction of the recording medium 4 corresponds to a left-right direction of the printing apparatus 1. Furthermore, a direction orthogonal to the front-rear direction and the left-right direction, namely, a direction perpendicular to the sheet surface in FIG. 1 corresponds to an up-down direction of the printing apparatus 1. Note that the left-right direction is an example of a "first direction" of the present embodiment, and the front-rear direction (conveying direction) is an example of a "second direction" of the present embodiment.

Figure 2:
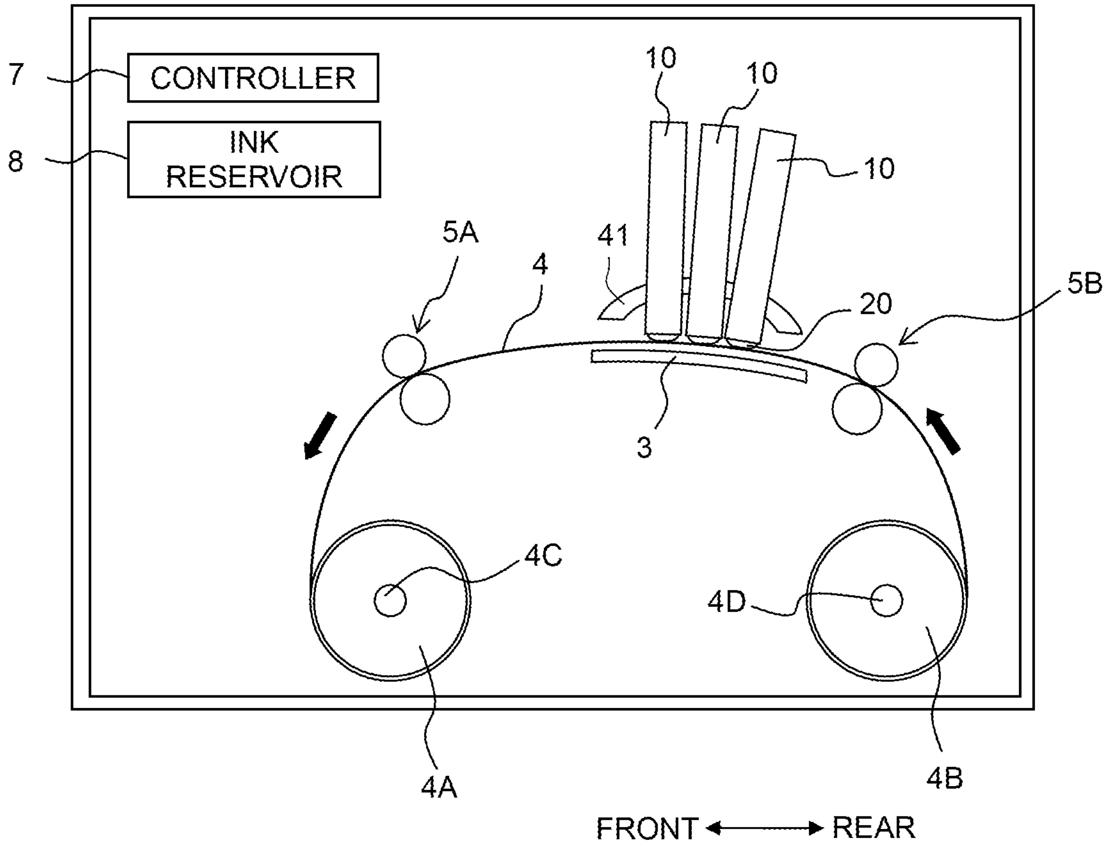
FIG. 2 is a schematic view of the printing apparatus 1.

As depicted in FIGS. 1 and 2, the printing apparatus 1 is provided with a platen 3, three line head assemblies 10 (an example of a "head assembly" of the present disclosure), two conveying rollers 5A and 5B, a controller 7, five ink reservoirs 8, etc., which are accommodated in a casing 2. Note that in FIGS. 1 and 2, only one reservoir 8 is depicted so as to simplify the drawings.

As depicted in FIGS. 1 and 2, a recording medium 4 is placed on an upper surface of the platen 3. The three line head assemblies 10 are arranged, at a location above the platen 3, so as to face (to be opposite to) the platen 3. An ink is supplied from the ink reservoir 8 to each of the line head assemblies 10. The structure of each of the line head assemblies 10 will be explained later on. Note that the three line head assemblies 10 are fixed to an arch frame 41 so that the three line head assemblies 10 are arranged along the front-rear direction (the conveying direction of the recording medium 4). As depicted in FIG. 2, the arch frame 41 has an arch shape, and the three line head assemblies 10 are arranged so that the three line head assemblies 10 are inclined with respect to a horizontal plane at mutually different angles.

As depicted in FIGS. 1 and 2, the two conveying rollers 5A and 5B are arranged, respectively, on the front side and the rear side of the platen 3. The two conveying rollers 5A and 5B are driven by a non-illustrated motor. As depicted in FIG. 2, the recording medium 4 is fed from a feeding roll 4A around which the recording medium 4 is wound in a roll shape, and is wound by a winding roll 4B. For example, it is allowable to use roll paper (roll paper sheet) as the recording medium 4. Rotating shafts 4C and 4D, which are rotated by a non-illustrated motor, are attached to the feeding roll 4A and the winding roll 4B, respectively. These two rotating shafts 4C and 4D and the two conveying rollers 5A and 5B cooperate so as to feed the recording medium 4 from the feeding roll 4A, to convey the recording medium 4 toward the downstream side in the conveying direction (frontward) so that the recording medium 4 passes on the platen 3, and to cause the recording medium 4 to be wound by the winding roll 4B. The two rotating shafts 4C and 4D and the two conveying rollers 5A and 5B are an example of a "conveying mechanism" of the present disclosure.

Figure 3:
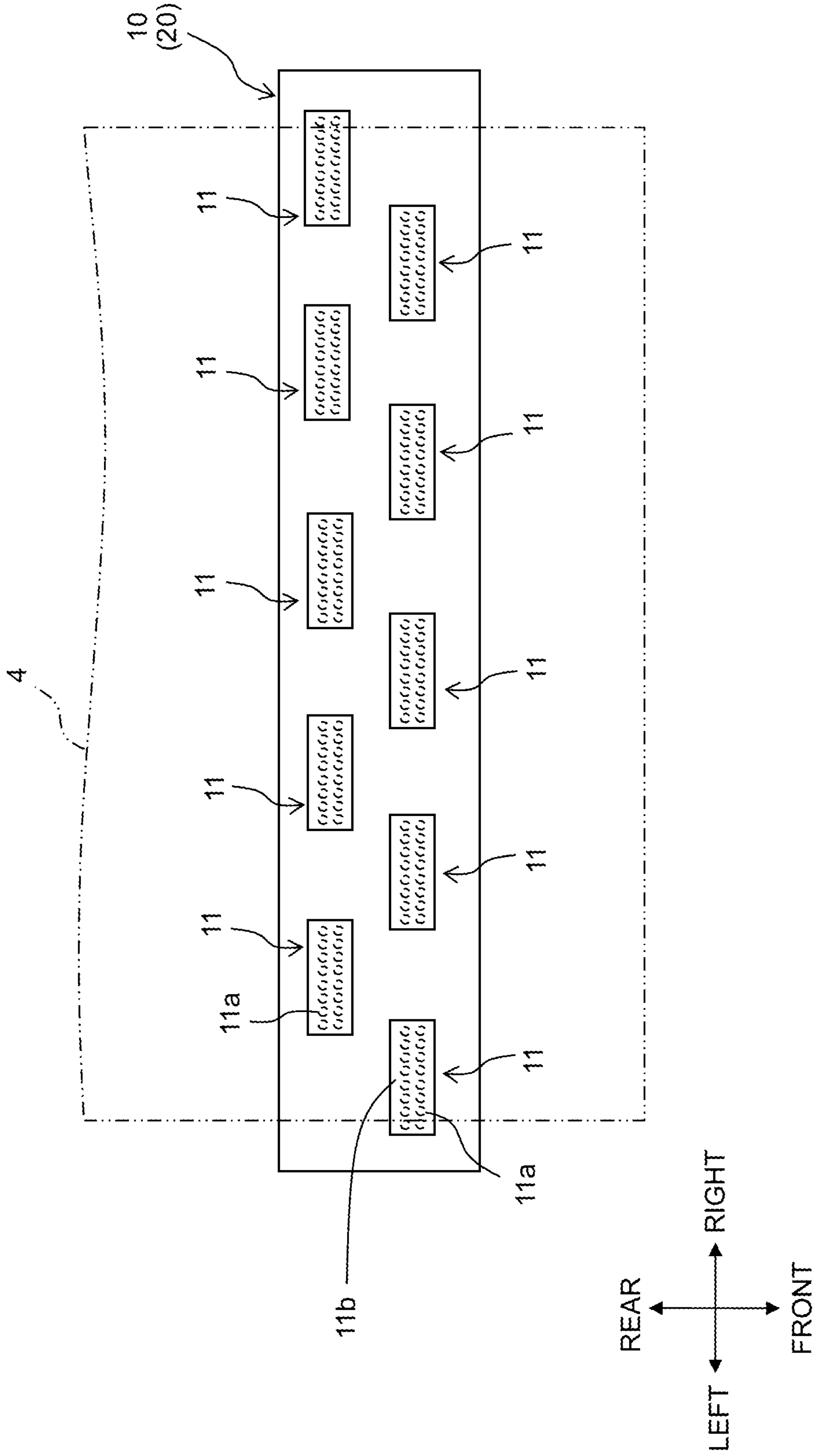
FIG. 3 is a schematic view for explaining arrangement of heads 11 included in a line head 20.

As depicted in FIG. 3, each of the line head assemblies 10 is provided with a line head 20 having a plurality of heads 11 (10 pieces of the head 11 in the present embodiment). The plurality of heads 11 construct two head rows (head arrays) which are arranged in the front-rear direction. Each of the head rows includes 5 pieces of the head 11 which are arranged in the left-right direction. Positions in the front-rear direction of the five heads 11 arranged in the left-right direction are same. Note that, however, in the following explanation, the phrase that "the positions are same" does not mean that the positions are same in a strict sense; rather, the phrase intends to mean that the positions are same within a manufacturing error and an attaching error. Note that the positions in the left-right direction of the heads 11 included in the two head rows are shifted from one another. Namely, 10 pieces of the head 11 are arranged in a staggered manner.

A lower surface 11*b* of each of the heads 11 is a nozzle surface in which a plurality of nozzles 11*a* are formed. As depicted in FIG. 3, the plurality of nozzles 11*a* of each of the heads 11 are arranged in a row form along the left-right direction which is the longitudinal direction of the line head 20 (line head assembly 10) to thereby construct two nozzle rows. Note that although an intra-head channel is formed in the inside of each of the heads 11, the shape, etc., of the intra-head channel will be described later on.

As described above, the ten heads 11 in each of the line head assemblies 10 (line heads 20) form the two head rows. As described above, each of the ten heads 11 has the two nozzle rows. Since it is possible to discharge or eject different color inks from the respective nozzle rows, each of the ten heads 11 is capable of ejecting two color inks, at most. A white ink is supplied from one of the five ink reservoirs 8 to ten heads 11 of a line head assembly 10 which is arranged on the rearmost side (arranged closest to the upstream side in the conveying direction) among the three line head assemblies 10. The white ink is usable for under-layer printing. A yellow ink and a magenta ink are supplied, respectively, from two of the five ink reservoirs 8 to ten heads 11 of a line head assembly 10 which is arranged second from the rear side (second from the upstream side in the conveying direction) among the three line head assemblies 10. The yellow ink is ejected from a nozzle row which is arranged on the rear side (the upstream side in the conveying direction) among the two nozzle rows; and the magenta ink is ejected from a nozzle row which is arranged on the front side (the downstream side in the conveying direction) among the two nozzle rows, of each of the heads 11. A cyan ink and a black ink are supplied, respectively, from two of the five ink reservoirs 8 to ten heads 11 of a line head assembly 10 which is arranged on the frontmost side (arranged closest to the downstream side in the conveying direction) among the three line head assemblies 10. The cyan ink is ejected from a nozzle row which is arranged on the rear side (the upstream side in the conveying direction) among the two nozzle rows; and the black ink is ejected from a nozzle row which is arranged on the front side (the downstream side in the conveying direction) among the two nozzle rows, of each of the heads 11. In the present embodiment, the inks are ejected from the three line head assemblies 10 which are arranged in the conveying direction in an order of a light (pale) color ink to a deep color ink from the upstream side toward the downstream side in the conveying direction, as described above. Note that in the present embodiment, each of the white ink, the yellow ink, the magenta ink, the cyan ink and the black ink is an UV-curable ink. The viscosity of the UV-curable ink varies or changes greatly depending on the temperature. In order to avoid any unsatisfactory ejection, it is necessary to maintain the viscosity of the ink within an appropriate range. For this purpose, it is necessary to maintain the temperature of the UV-curable ink at an appropriate temperature.

The controller 7 is provided with a FPGA (Field Programmable Gate Array), an EEPROM (Electrically Erasable Programmable Read-Only Memory), a RAM (Random Access Memory), etc. Note that the controller 7 may be provided with a CPU (Central Processing Unit) or an ASIC (Application Specific Integrated Circuit), etc. The controller 7 is connected to an external apparatus 9 such as a PC, etc., to be capable of data communication, and controls the respective parts or components of the printing apparatus 1 based on print data transmitted from the external apparatus 9.

The controller 7 controls the motor driving the rotating shafts 4C and 4D and the motor driving the conveying rollers 5A and 5B so as to causes the two conveying rollers 5A and 5B to convey the recording medium 4 in the conveying direction. Further, the controller 7 controls the three line head assemblies 10 so as to eject the ink(s) from the nozzles 11*a* toward the recording medium 4. With this, an image is printed on the recording medium 4.

<Configuration of Line Head Assembly 10>

Figure 5:
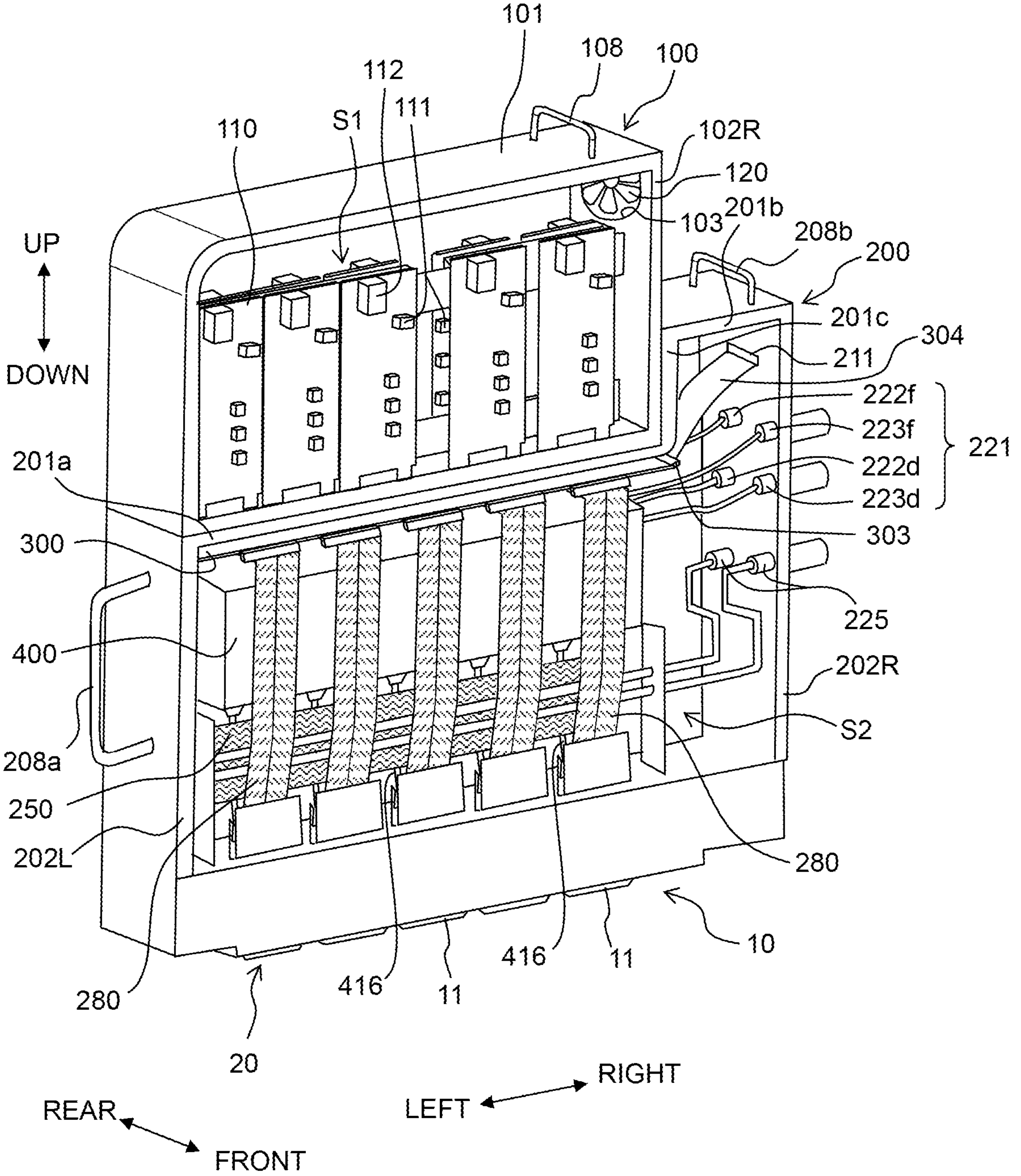
FIG. 5 is a schematic view explaining a line head assembly 10.

Next, the structure of the line head assembly 10 will be explained, with reference to the drawings. Note that since the three line head assemblies 10 has a same structure, the explanation will be made regarding one of the line head assemblies 10. As described above, the three line head assemblies 10 are arranged so as to be inclined with respect to the horizontal plane at the mutually different angles, respectively. However, in order to simplify the explanation, in the following description, the direction(s) is (are) defined on the premise that the line head assemblies 10 are arranged perpendicularly with respect to the horizontal plane. As depicted in FIG. 5, each of the line head assemblies 10 is mainly provided with: a first casing 100, a second casing 200, a line head 20 including ten heads 11, ten rigid substrates 110, ten flexible substrates 280, a fan 120, a relay substrate 300, a tank 400, a heater 250, and a plurality of tubes 416 connected to the heads 11 and the tank 400. Note that in FIG. 5, five flexible substrates 280 among the ten flexible substrates 280 are depicted.

<First Casing 100 and Second Casing 200>

Figure 4:
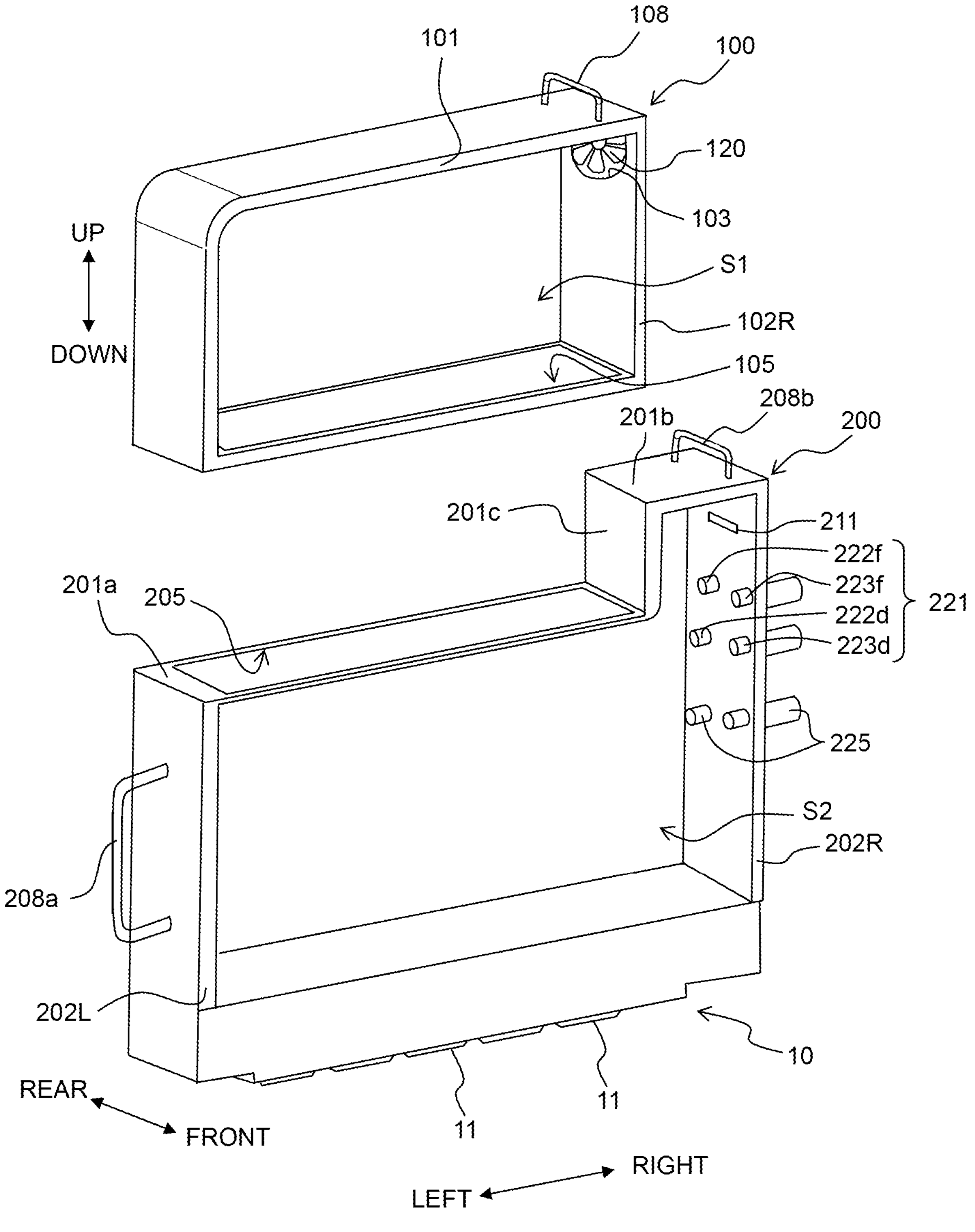
FIG. 4 is a perspective view of a first casing 100 and a second casing 200.

As depicted in FIGS. 4 and 5, the first casing 100 is arranged to be superposed above the second casing 200. The first casing 100 defines, in the inside thereof, a first space S1, and the second casing 200 defines, in the inside thereof, a second space S2. Note that in FIGS. 4 and 5, a side surface on the front side and a side surface on the rear side of each of the first casing 100 and the second casing 200 are removed so that the first space S1 and the second spaced S2 are easily seen. Note that the left-right direction corresponds to a depth direction of the first casing 100 and the second casing 200, and the front-rear direction corresponds to a width direction of the first casing 100 and the second casing 200. The depth direction is orthogonal to both of the up-down direction and the width direction.

As depicted in FIG. 4, the first casing 100 has a substantially rectangular parallelepiped shape. A top plate 101 defining the upper surface of the first casing 100 is provided with a first grip 108. A airflow port 103 is opened in a side wall 102R on the right side of the first casing 100. The fan 120 is attached to the airflow port 103. As will be described later on, the fan 102 is capable of feeding airflow (air) in an aligning direction (the left-right direction, the depth direction) of the rigid substrates 110. Further, an opening 105 is formed in the lower surface of the first casing 100.

The second casing 200 has such a shape that two rectangular parallelepipeds of which heights are mutually different are combined, and has, for example, a substantially shape of a letter "L" as seen from the front-rear direction. The upper surface of the second casing 200 has a first top plate 201*a*, a second top plate 201*b* which is positioned on the right side and on the upper side of the first top plate 201*a*, and a connecting wall 201*c* which links the first top plate 201*a* and the second top plate 201*b* and extends in the up-down direction. The connecting wall 201*c* expands in the width direction (front-rear direction) and the up-down direction, and is orthogonal to the depth direction (left-right direction). An opening 205 is formed in the first top plate 201*a*. Note that an opening area of the opening 105 formed in the lower surface of the first casing 100 and an opening area of the opening 205 formed in the first top plate 201*a* of the second casing 200 are approximately same. In a case that the first casing 100 is arranged to be overlaid on the upper surface of the second casing (the first top plate 201*a*) from thereabove, the two openings 105 and 205 overlap with each other in the up-down direction.

A second grip 208*a* is provided on a side wall 202L on the left side of the second casing 200, and a third grip 208*b* is provided on the second top plate 201*b* of the second casing 200. An electric power input port 211, four ink ports 221 and a set of cooling water ports 225 are provided on a side wall 202R on the right side of the second casing 200. The set of cooling water ports 225 are each a port for circulating a cooling water for cooling the heads 11. A non-illustrated piezoelectric actuator provided in the inside of each of the heads 11 generates heat accompanying with being driven. Accordingly, in a case that the head 11 is not sufficiently cooled, any unevenness in the temperature occurs in the head 11, due to which any difference in the viscosity occurs, in some cases, between a certain nozzle 11*a* and another nozzle 11*a*. In such a case, even in a case that a driving signal of a same waveform is inputted, there is such a fear that any difference in the size might arise between an ink droplet of the ink ejected from the certain nozzle 11*a* and an ink droplet of the ink ejected from the another nozzle 11*a*, in some cases, and which might lead to any lowering in the print quality. In view of this, in the present embodiment, the cooling water is introduced from the set of cooling water ports 225 so as to cool the heads 11. A non-illustrated electric power cable from a non-illustrated external power source is connected to the electric power input port 211. The four ink ports 221 has a first ink supply port 222*f*, a second ink supply port 223*f*, a first ink discharge port 222*d*, and a second ink discharge port 223*d*. The first ink supply port 222*f* and the first ink discharge port 222*d* construct a pair, and are connected to a same ink reservoir 8 (see FIG. 14). Namely, a same ink flows in the pair of the first ink supply port 222*f* and the first ink discharge port 222*d*. The first ink supply port 222*f* and the first ink discharge port 222*d* are connected, respectively, to a first supply port 458 and a first discharge port 468 of the tank 400 (see FIG. 9). The second ink supply port 223*f* and the second ink discharge port 223*d* construct another pair, and are connected to a same ink reservoir 8 (see FIG. 15). Namely, a same ink flows in the pair of the second ink supply port 223*f* and the second ink discharge port 223*d*. Note that it is not necessarily indispensable that the ink flowing in the pair of the first ink supply port 222*f* and the first ink discharge port 222*d* and the ink flowing in the pair of the second ink supply port 223*f* and the second ink discharge port 223*d* are same; for example, the inks may be different from each other. Further, the second ink supply port 223*f* and the second ink discharge port 223*d* are connected, respectively, to a second supply port 478 and a second discharge port 488 of the tank 400 (see FIG. 9).

As depicted in FIGS. 4 and 5, since the four ink ports 221 are arranged on the lower side of the power source input port 211, in a case that the ink leaks from the ink port(s) 211 and drips downward, there is no such a fear that the ink might adhere to the electric power input port 211. With this, it is possible to prevent any shortage which would be otherwise caused by any dirtying of and the adhesion of the ink to the electric power input port 211.

As depicted in FIG. 5, the relay substrate 300 is attached to the second casing 200 so as to close the opening 205, formed in the first top plate 201*a* of the second casing 200, from therebelow. An upper surface of the relay substrate 300 is exposed from the opening 105 of the first casing 100, and the upper surface of the relay substrate 300 closes the opening of the first casing 100. Namely, the relay substrate 300 closes both of the opening 105 in the lower surface of the first casing 100 and the opening 205 in the upper surface of the second casing 200. With this, the upper surface of the relay substrate 300 defines a part of the first space S1 and the lower surface of the relay substrate 300 defines a part of the second space S2.

<Relay Substrate 300>

Figure 6A:
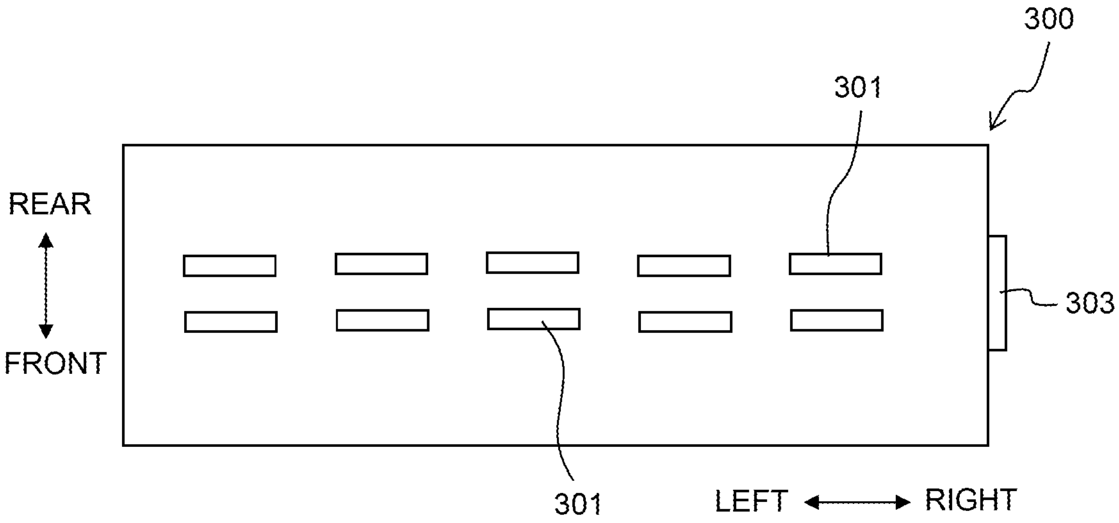
FIG. 6A is a top view of a relay substrate 300.
Figure 6B:
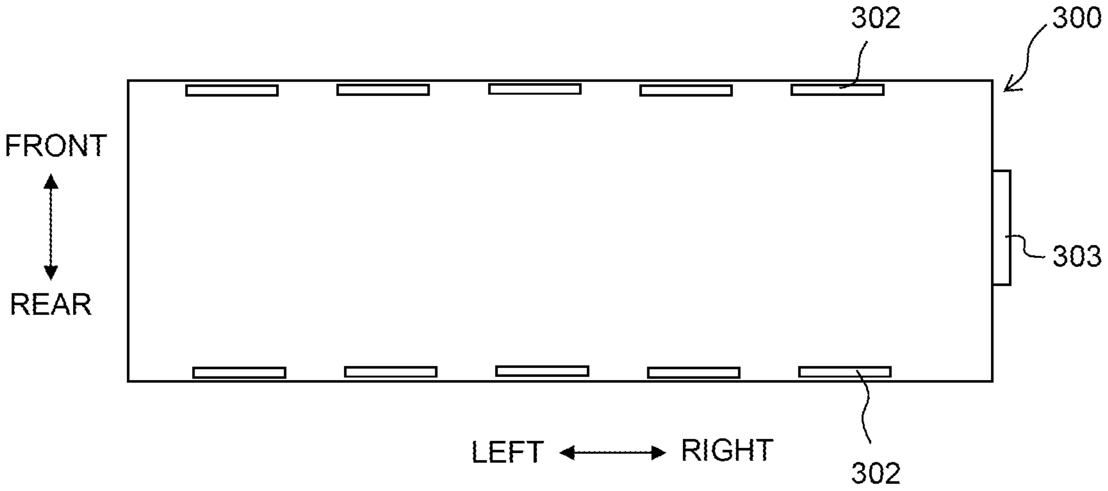
FIG. 6B is a bottom view of the relay substrate 300.

As depicted in FIGS. 6A and 6B, the relay substrate 300 is provided with 10 pieces of a first connector 301, 10 pieces of a second connector 302 and a power source connector 303. The power source connector 303 is arranged at a right end of the relay substrate 300. As described above, the power source input port 211 is provided on the side wall 202R on the right side of the second casing 200. As depicted in FIG. 5, the power source connector 303 of the relay substrate 300 and the power source input port 211 are connected by a power source cable 304. Further, the ten first connectors 301 are arranged on the upper surface, of the relay substrate 300, which is exposed in the first space S1. In other words, the ten first connectors 301 are arranged on the upper surface, of the relay substrate 300, facing the first space S1. The ten first connectors 301 are arranged in two rows in the front-rear direction (width direction). Each of the rows of the first connectors 301 includes 5 pieces of the first connector 301 arranged in the left-right direction (depth direction). Namely, an extending direction (row direction) of the row of the first connectors 301 is parallel to the depth direction (left-right direction). The ten second connectors 302 are arranged on the lower surface, of the relay substrate 300, which is exposed in the second space S2. In other words, the ten second connectors 302 are arranged on the lower surface, of the relay substrate 300, facing the second space S2. The ten second connectors 302 are also arranged in two rows in the width direction (front-rear direction); and each of the rows of the second connectors 302 includes 5 pieces of the second connector 302 arranged in the depth direction (left-right direction). Namely, an extending direction (row direction) of the row of the second connectors 302 is parallel to the depth direction (left-right direction). Note that the upper surface of the relay substrate 300 corresponds to a "first surface" of the relay substrate of the present disclosure, and the lower surfaced of the relay substrate 300 corresponds to a "second surface" of the relay substrate of the present disclosure.

The relay substrate 300 is provided with non-illustrated wirings each connected to one of 10 pieces of the first connector 301 and one of 10 pieces of the second connector 302. With this, the second connectors 302 arranged on the lower surface of the relay substrate 300 and the first connectors 301 arranged on the first surface of the relay substrate 300 are electrically connected. Further, the relay substrate 300 has non-illustrated electrical source wirings connected to the power source connector 303 and the ten first connectors 301, and non-illustrated electrical source wirings connected to the power source connector 303 and the ten second connectors 302. With this, the relay substrate 300 is capable of supplying the electric power from the non-illustrated external power source to a device, etc., connected to each of the first connectors 301 and the second connectors 302. Note that the non-illustrate external power source is different from a power source 112, of the rigid substrate 110, which will be described later on.

<Rigid Substrate 110>

Figure 7:
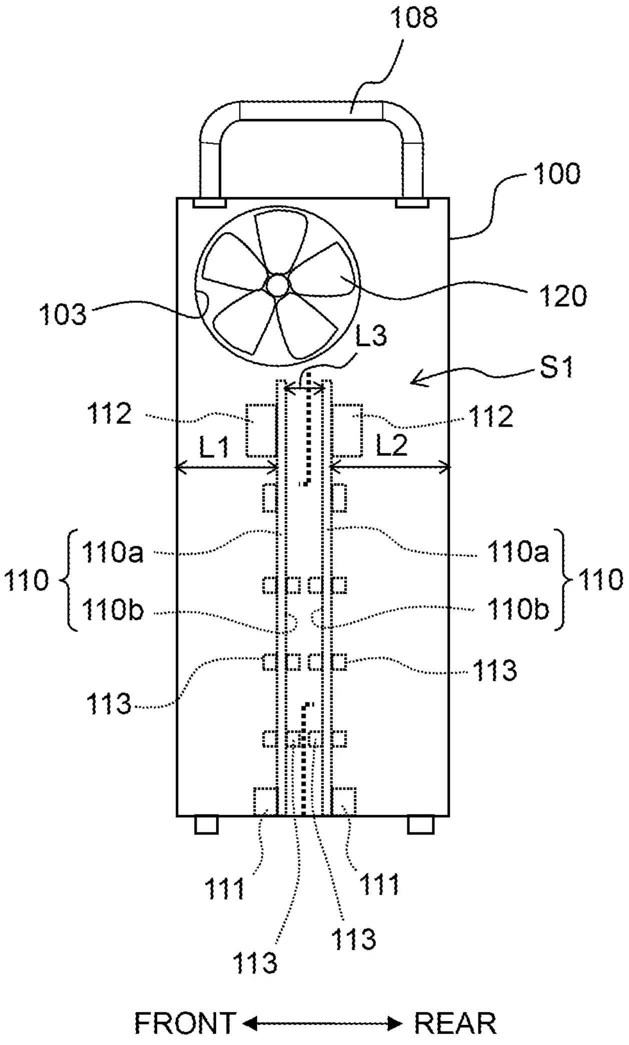
FIG. 7 is a rear view of the first casing 100.
Figure 10:
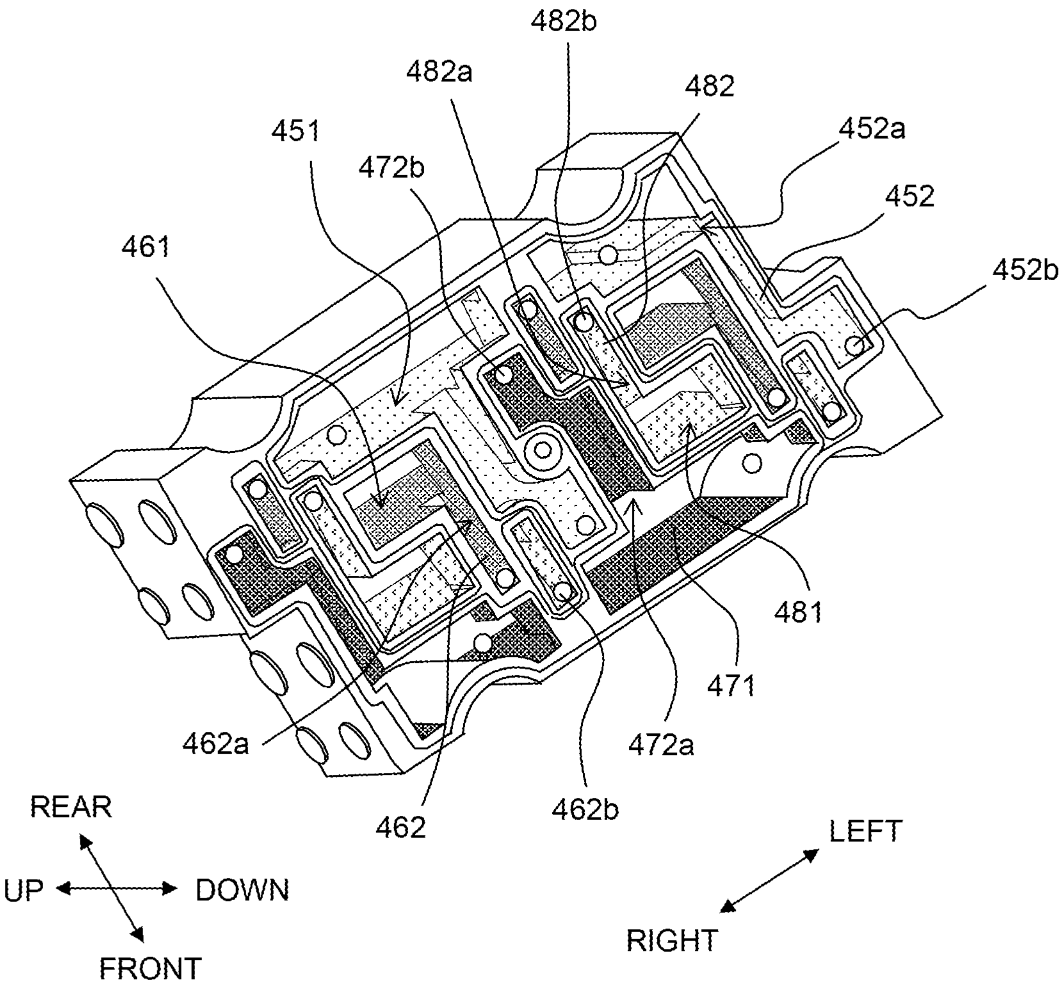
FIG. 10 is a perspective view of the tank 413 body as seen therebelow.

As depicted in FIGS. 5 and 7, 10 pieces of the rigid substrate 110 are arranged in the first space S1. As depicted in FIG. 7, each of the rigid substrates 110 is a rectangular substrate having a first surface 110*a* and a second surface 110*b*, and is a head controlling substrate configured to drive and control the head 11. Each of the rigid substrates 110 has a connector 111, a power source 112 and a plurality of circuit elements 113 which are mounted thereon. The power source 112 and a part of the plurality of circuit elements 113 are mounted on the first surface 110*a* of the rigid substrate 110. Remaining circuit elements 113, included in the plurality of circuit elements 113, are mounted on the second surface 110*b* which is a rear surface of the first surface 110*a*. Note that all of the plurality of circuit elements 113 are not of a same kind, and the plurality of circuit elements 113 includes a plurality of kinds of circuit elements.

The power source 112 mounted on the first surface 110*a* of each of the rigid substrates 110 is a power source element configured to generate the driving signal of the non-illustrated piezoelectric actuator included in the head 11. The power source 112 is not mounted on the second surface 110*b* of each of the rigid substrates 110; circuit elements configured to process a high speed signal are mounted on the second surface 110*b*, as the plurality of circuit elements 113. A height of the power source 112 mounted on the first surface 110*a* of each of the rigid substrates 110 is higher than a height of one of the plurality of circuit elements 113 mounted on the second surface 110*b* of each of the rigid substrates 110. Note that the term "height" described herein represents a height from each of the first surface 110*a* and the second surface 110*b* in a normal direction perpendicular to the rigid substrate 110 (parallel to the front-rear direction in FIG. 5).

The connector 111 is arranged on a lower end of each of the rigid substrates 110, and is inserted into each of the first connectors 301 of the relay substrate 300. With this, the rigid substrates 110 are fixed so as to stand perpendicularly with respect to the relay substrate 300 (see FIG. 7). As described above, since the first connectors 301 are aligned in the two rows, the rigid substrates 110 are also arranged to be aligned in two rows. As depicted in FIG. 7, the rigid substrates 110 are arranged in the two rows, with rigid substrates 110 in one row and rigid substrates 110 in the other row being arranged back to back such that the first surfaces 110*a* each having the power source 112 mounted thereon do not face one another in the width direction (front-rear direction). Namely, in two rigid substrates 110, which are included in the ten rigid substrates 110 and which face or are opposite to each other in the width direction (front-rear direction), the second surfaces 110*b* thereof on which only the circuit elements 113 having the height lower than the height of the electric source 112 are mounted face each other. Further, regarding the two rigid substrates 110 facing each other in the width direction (front-rear direction), a distance L1 in the front-rear direction between the rigid substrate 110 on the front side and a side surface on the front side of the casing 100 and a distance L2 in the front-rear direction between the rigid substrate 110 on the rear side and a side surface on the rear side of the casing 100 are each greater than a distance L3 in the front-rear direction between the two rigid substrates 110 facing each other in the width direction (front-rear direction).

As described above, the fan 120 is capable of feeding wind or airflow in the aligning direction of the rows of the rigid substrates 110 (the depth direction, the left-right direction). Since the direction in which the airflow is fed is a direction parallel to the first surface 110*a* and the second surface 110*b* of each of the rigid substrates 110, the rigid substrates 110 do not hinder the flow of the airflow. Accordingly, it is possible to feed the air flow fed from the fan 120 up to the back (inner part) of the first casing 100, along the aligning direction of the rows of the rigid substrates 110 (the depth direction, the left-right direction), thereby making it possible to efficiently cool the 10 pieces of the rigid substrate 110.

The above-described distances L1 and L2 each correspond to the distance between the first surface 110*a* having the power sources 112 mounted thereon and the side surface of the first casing 100, and the above-described distance L3 corresponds to the distance between the second surfaces 110*b* on each of which the power source 112 is not mounted. As described above, since the distances L1 and L2 are greater than the distance L3, it is possible to send the airflow efficiently to the power sources 112 of which heat generating amount is great and to cool the power sources 112.

Next, members arranged in the second space S2 will be explained. The lower surface of the relay substrate 300 is exposed in the second space S2 of the second casing 200. Further, the line head 20 including the ten heads 11, the ten flexible substrates 280, the tank 400, the heater 250, and the plurality of tubes 416 connected to the heads 11 and the tank 400 are arranged in the second space S2.

<Flexible Substrate 280>

One end of each of the flexible substrates 280 is connected to one of the second connectors 302 of the relay substrate 300. Further, the other end of each of the flexible substrates 280 is connected to one of the heads 11. Note that, as described above, the second connectors 302 of the relay substrate 300 are electrically connected to the first connectors 301 arranged on the upper surface of the relay substrate 300, and further that the first connectors 301 are electrically connected to the connectors 111 of the rigid substrates 110. Namely, the rigid substrates 110, each of which is a head controlling substrate configured to drive and control one of the heads 11, is connected to one of the heads 11 via the relay substrate 300 and one of the flexible substrates 280. With this, each of the rigid substrates 110 is capable of transmitting a control signal with respect to one of the heads 11, such as the driving signal with respect to the non-illustrated piezoelectric actuator of one of the heads 11, via the relay substrate 300 and one of the flexible substrates 280.

<Tank 400>

Figure 8:
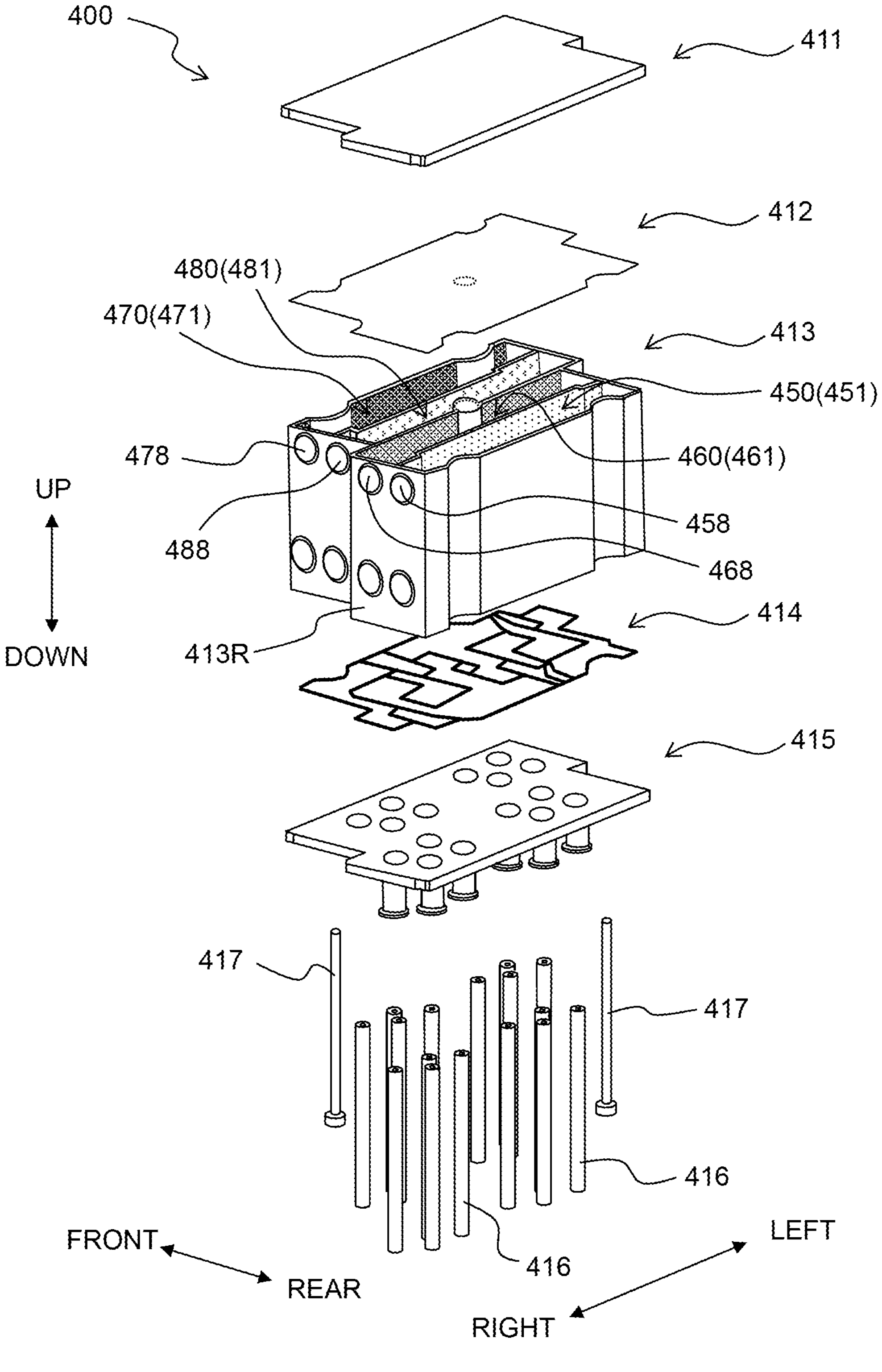
FIG. 8 is an exploded perspective view of a tank 400.
Figure 11:
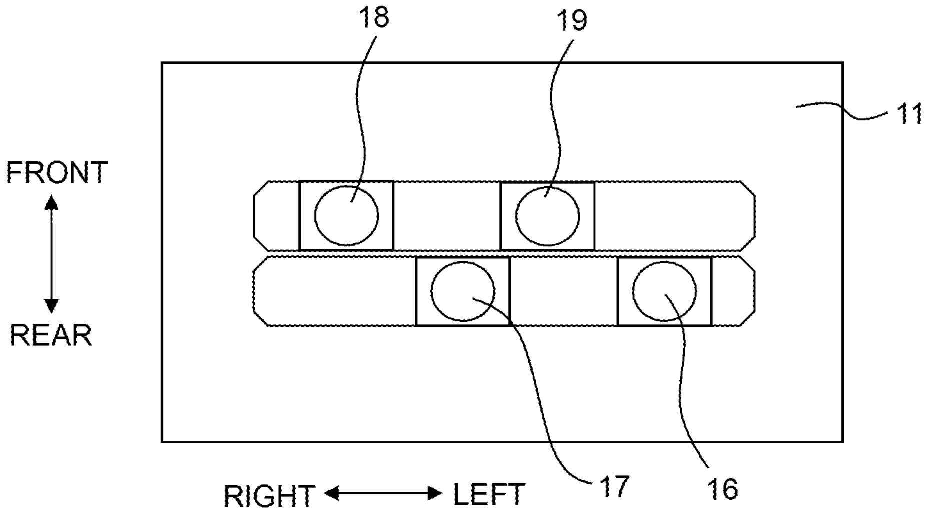
FIG. 11 is a schematic top view of the head 11.
Figure 14:
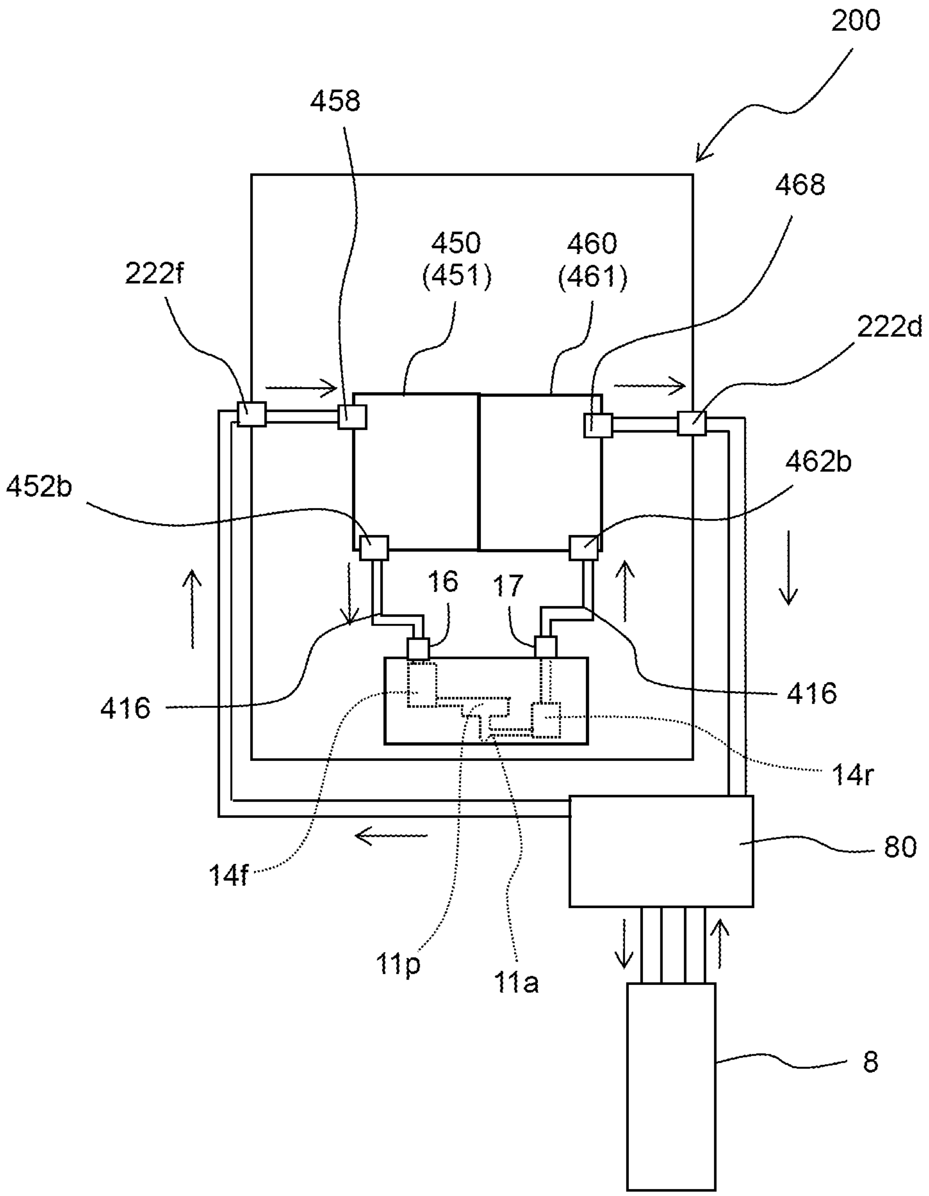
FIG. 14 is a view for explaining a circulating route of an ink.
Figure 15:
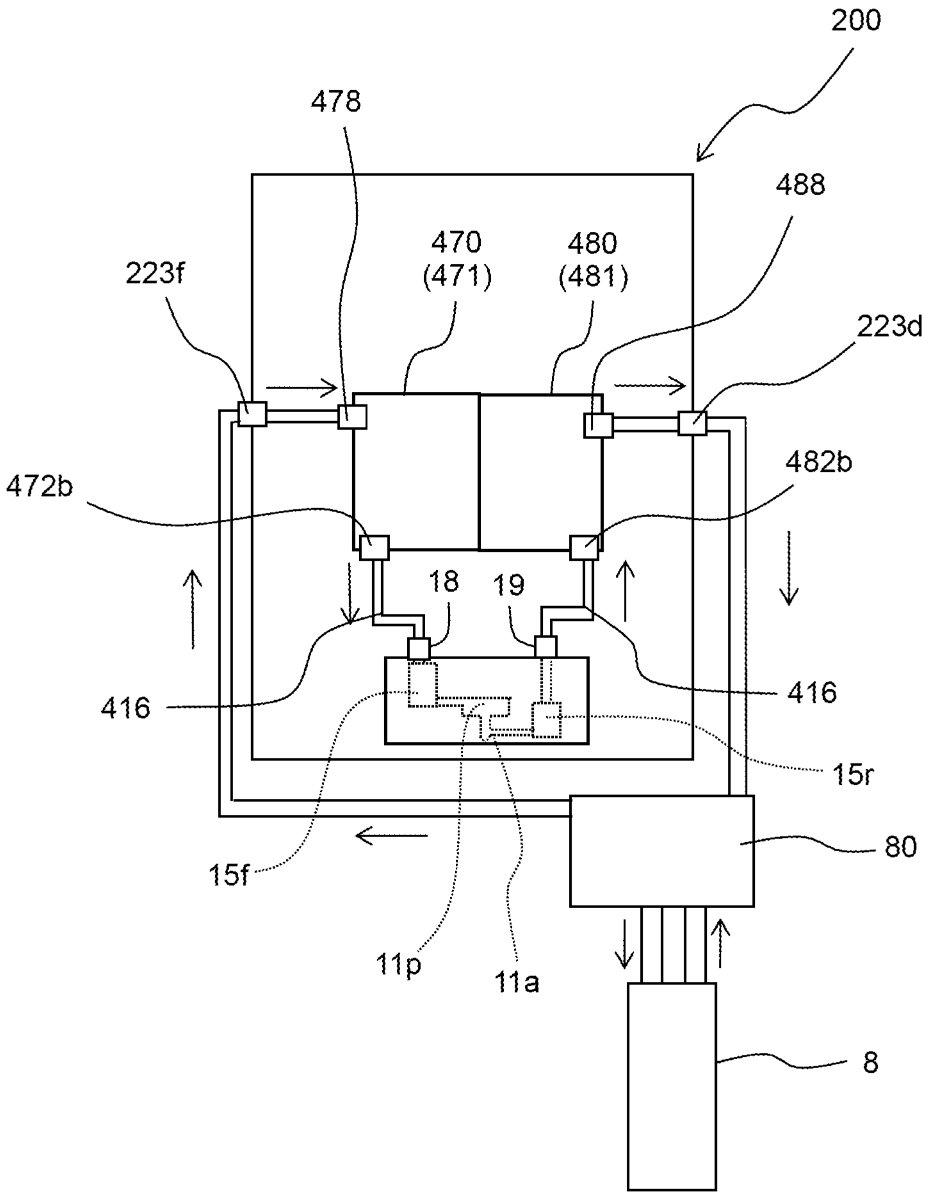
FIG. 15 is a view for explaining another circulating route of the ink.

As depicted in FIG. 5, the tank 400 is arranged in the second space S2 at a location below the relay substrate 300. The tank 400 has a shape of a substantially rectangular parallelepiped which is long in the left-right direction. As depicted in FIG. 8, the tank 400 is mainly provided with: a top plate 411, an upper seal rubber 412, a tank body 413, a lower seal rubber 414, a bottom plate 415 and the plurality of tubes 416. The tank body 413 is formed of a resin, and can be formed, for example, by an injection molding. The top plate 411 and the bottom plate 415 may be formed of a resin or a metallic material. The top plate 411 is fixed to an upper part of the tank body 413, in a state that the top plate 411 sandwiches the upper seal rubber 412 between the top plate 411 and the tank body 413. Further, the bottom plate 415 is fixed to a lower part of the tank body 413, in a state that the bottom plate 415 sandwiches the lower seal rubber 414 between the bottom plate 415 and the tank body 413. The top plate 411 and the bottom plate 415 are screwed to the tank body 413 by a plurality of screws 417. Note that as depicted in FIG. 11, one piece of the head 11 is provided with a first supply port 16, a first discharge port 17, a second supply port 18 and a second discharge port 19. As will be described later on, two ink circulating routes corresponding to the two nozzle rows, respectively, are provided on the head 11 (see FIGS. 14 and 15). As depicted in FIG. 14, one end of one of the ink circulating routes is connected to the first supply port 16, and the other end of the one of the ink circulating routes is connected to the first discharge port 17. Further, as depicted in FIG. 15, one end of the other of the ink circulating routes is connected to the second supply port 18, and the other end of the other of the ink circulating routes is connected to the second discharge port 19. The tank 400 and one piece of the head 11 are connected to each other by four pieces of the tube 416. Among the four tubes 416, a first tube 416 is communicated with the first supply port 16, a second tube 416 is communicated with the first discharge port 17, a third tube 416 is communicated with the second supply port 18 and a fourth tube 416 is communicated with the second discharge port 19. Since the tank 400 is connected to 10 pieces of the head 11, the tank 400 is connected to 40 pieces of the tube 416. However, in order to simplify the drawing, the number of the tube 416 connected to the tank 400 is reduced in the illustration of FIG. 8.

Figure 9:
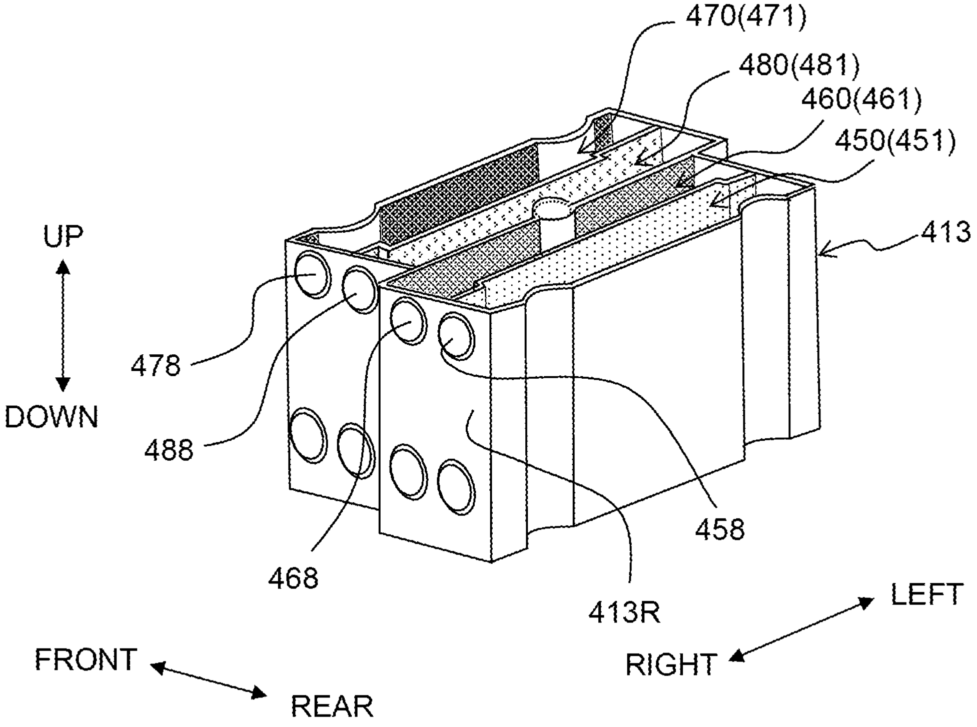
FIG. 9 is a perspective view of a tank 413 body as seen thereabove.

As depicted in FIGS. 8 and 9, a first supply channel 450, a first discharge channel 460, a second supply channel 470 and a second discharge channel 480 are formed in the tank body 413. Note that these four channels each extend in the left-right direction. Further, these four channels are arranged side by side in the front-rear direction. Note that these four channels are arranged, from the rear side toward the front side in the front-rear direction, namely, from the upstream side toward the downstream side in the conveying direction, in an order of the first supply channel 450, the first discharge channel 460, the second discharge channel 480 and the second supply channel 470. Note that in FIGS. 8 and 9, only a part of each of the first supply channel 450, the first discharge channel 460, the second supply channel 470 and the second discharge channel 480 is depicted so that the length in the left-right direction of the tank 400 becomes (appears) to be short, in order to simplify the drawings.

A first supply port 458 connected to the first supply channel 450, a first discharge port 468 connected to the first discharge channel 460, a second discharge port 488 connected to the second discharge channel 480, and a second supply port 478 connected to the second supply channel 470 are provided on a side wall 413R on the right side of the tank body 413.

<Ink Channel Inside Tank 400>

Figure 12:
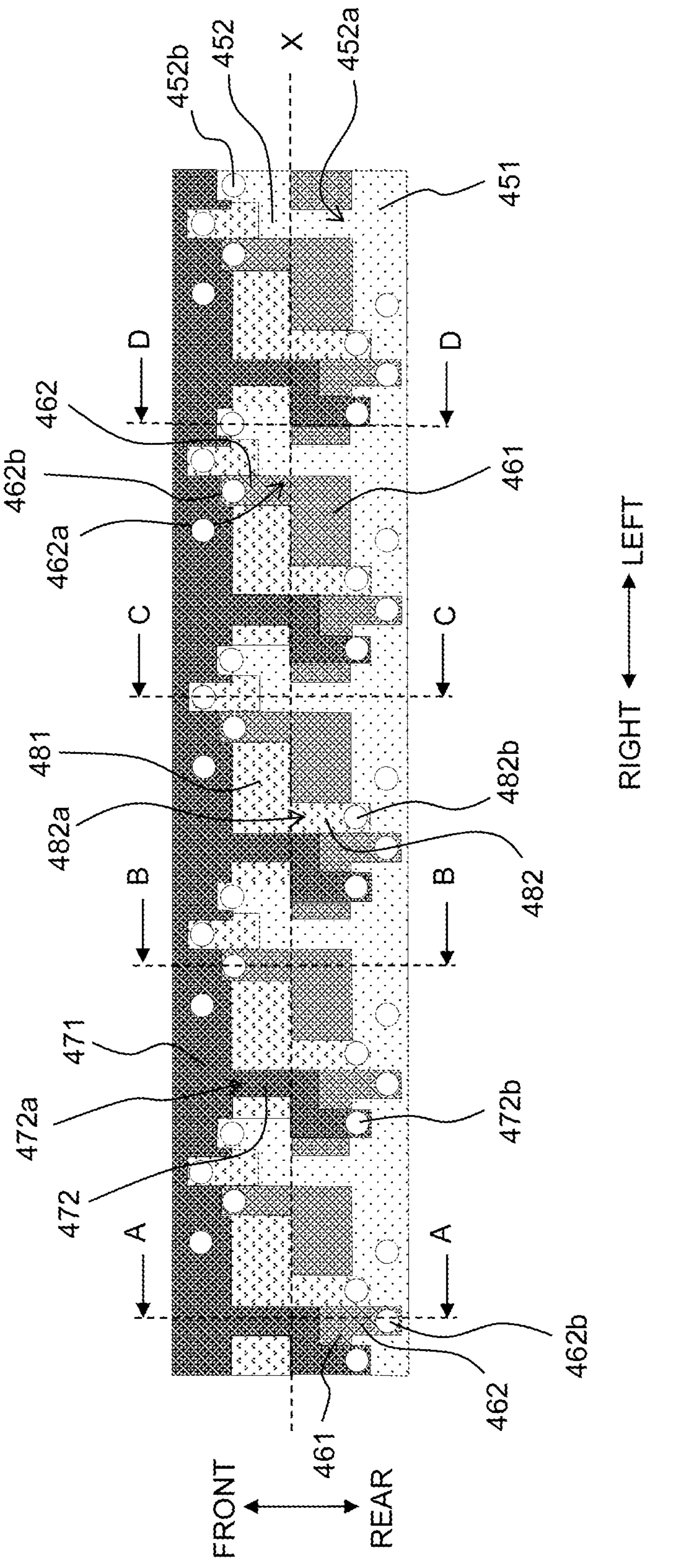
FIG. 12 is a view for explaining a channel in the tank 400.

Next, an ink channel formed in the inside of the tank 400 will be explained in further detail. As depicted in FIGS. 10 and 12, the first supply channel 450 has a first main supply channel 451, and 10 pieces of a first branched supply channel 452 which are branched from the first main supply channel 451 at a location below the first main supply channel 451. The ten first branched supply channels 452 correspond to the ten heads 11, respectively. Note that in FIG. 10, only a part of each of the first supply channel 450, the first discharge channel 460, the second supply channel 470 and the second discharge channel 480 is depicted so that the length in the left-right direction of the tank 400 becomes (appears) to be short, in order to simplify the drawings, in a similar manner regarding FIGS. 8 and 9. Further, in FIG. 10, only a part of the ten first branched supply channels 452 is depicted. One end 452*a* of each of the first branched supply channels 452 is connected to the first main supply channel 451, and the other end 452*b* of each of the first branched supply channels 452 is connected to one of the tubes 416.

As depicted in FIGS. 10 and 12, the first discharge channel 460 has a first main discharge channel 461, and 10 pieces of a first branched discharge channel 462 which are branched from the first main discharge channel 461 at a location below the first main discharge channel 461. The ten first branched discharge channels 462 correspond to the ten heads 11, respectively. Note that in FIG. 10, only a part of the ten first branched discharge channels 462 is depicted so as to simplify the drawing. One end 462*a* of each of the first branched discharge channels 462 is connected to the first main discharge channel 461, and the other end 462*b* of each of the first branched discharge channels 462 is connected to one of the tubes 416.

As depicted in FIGS. 10 and 12, the second supply channel 470 has a second main supply channel 471, and 10 pieces of a second branched supply channel 472 which are branched from the second main supply channel 471 at a location below the second main supply channel 471. The ten second branched supply channels 472 correspond to the ten heads 11, respectively. Note that in FIG. 10, only a part of the ten second branched supply channels 472 is depicted so as to simplify the drawing. One end 472*a* of each of the second branched supply channels 472 is connected to the second main supply channel 471, and the other end 472*b* of each of the second branched supply channels 472 is connected to one of the tubes 416.

As depicted in FIGS. 10 and 12, the second discharge channel 480 has a second main discharge channel 481, and 10 pieces of a second branched discharge channel 482 which are branched from the second main discharge channel 481 at a location below the second main discharge channel 481. The ten second branched discharge channels 482 correspond to the ten heads 11, respectively. Note that in FIG. 10, only a part of the ten second branched discharge channels 482 is depicted so as to simplify the drawing. One end 482*a* of each of the second branched discharge channels 482 is connected to the second main discharge channel 481, and the other end 482*a* of each of the second branched discharge channels 482 is connected to one of the tubes 416.

As depicted in FIG. 11, the first supply port 16, the first discharge port 17, the second supply port 18 and the second discharge port 19 are arranged in the upper surface of each of the heads 11. The first supply port 16 and the first discharge port 17 are arranged in the left-right direction, and the first supply port 16 is located on the left side of the first discharge port 17. The second supply port 18 and the second discharge port 19 are arranged in the left-right direction, and the second supply port 18 is located on the right side of the second discharge port 19. Further, the pair of the first supply port 16 and the first discharge port 17 is located on the rear side of the pair of the second supply port 18 and the second discharge port 19.

Corresponding to the above-described arrangement of the first supply port 16, the first discharge port 17, the second supply port 18 and the second discharge port 18 in the upper surface of each of the heads 11, the other end 452*b* of each of the first branched supply channels 452, the other end 462*b* of each of the first branched discharge channels 462, the other end 472*b* of each of the second branched supply channels 472 and the other end 482*b* of each of the second branched discharge channels 482 are arranged in a similar manner, as depicted in FIG. 12. Namely, the other end 452*b* of each of the first branched supply channels 452 and the other end 462*b* of each of the first branched discharge channels 462 are arranged in the left-right direction, and the other end 472*b* of each of the second branched supply channels 472 and the other end 482*b* of each of the second branched discharge channels 482 are arranged in the left-right direction.

As described above, corresponding to that the ten heads 11 are arranged in the staggered manner so as to form the two head rows extending in the left-right direction, the set of the other end 452*b* of each of the first branched supply channels 452, the other end 462*b* of each of the first branched discharge channels 462, the other end 472*b* of each of the second branched supply channels 472 and the other end 482*b* of each of the second branched discharge channels 482, which corresponds to one head 11, are also arranged in a staggered manner so as to form two rows extending in the left-right direction. Namely, the set of the other end 452*b* of each of the first branched supply channels 452, the other end 462*b* of each of the first branched discharge channels 462, the other end 472*b* of each of the second branched supply channels 472, and the other end 482*b* of each of the second branched discharge channels 482, which corresponds to one head 11, are arranged at positions overlapping, respectively, with the first supply port 16, the first discharge port 17, the second supply port 18 and the second discharge port 19 of the head 11, in the up-down direction.

<Shape of First Branched Supply Channel 452 (Second Branched Supply Channel 472)>

Next, the shape of the first branched supply channel 452 will be explained, with reference to the drawings. Note that since the second branched supply channel 472 has a shape which is symmetrical to the first branched supply channel 452 with respect to a line X in FIG. 12, any detailed explanation for the second branched supply channel 472 will be omitted.

Figure 13A:
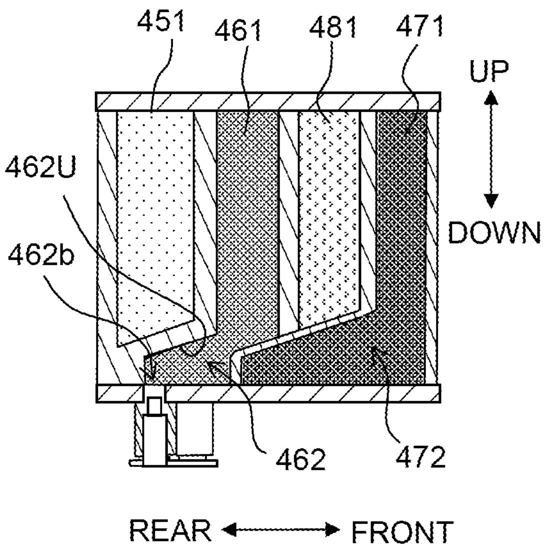
FIG. 13A is a cross-sectional view taken along a cross section "A" in FIG. 12.
Figure 13C:
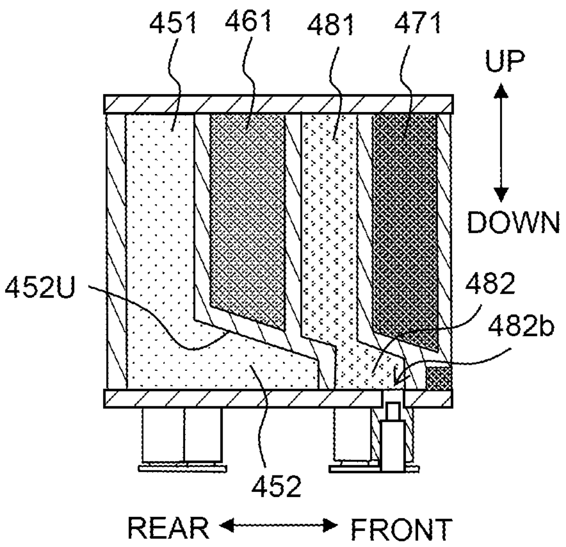
FIG. 13C is a cross-sectional view taken along a cross section "C" in FIG. 12.
Figure 13B:
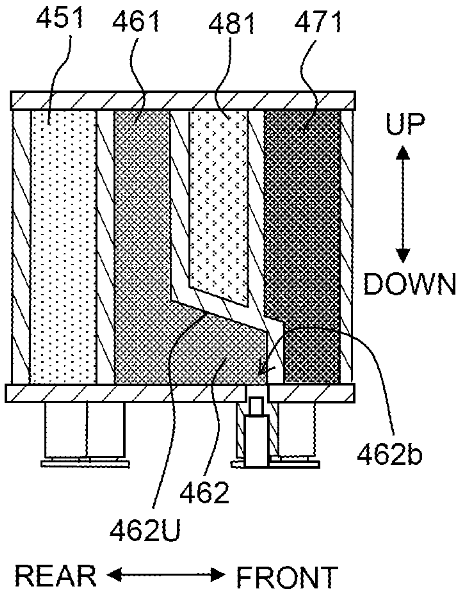
FIG. 13B is a cross-sectional view taken along a cross section "B" in FIG. 12.
Figure 13D:
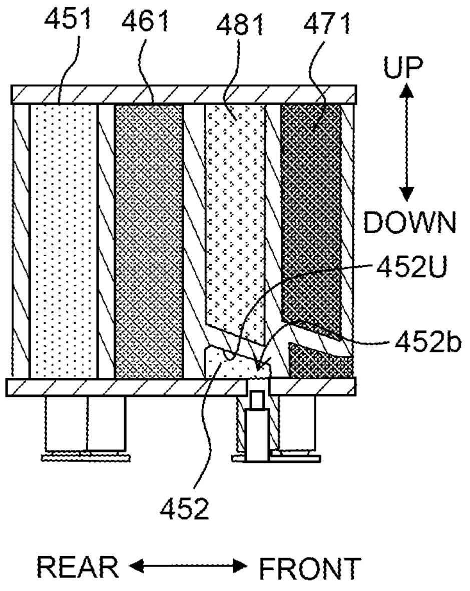
FIG. 13D is a cross-sectional view taken along a cross section "D" in FIG. 12.

In the following explanation, the first main supply channel 451, the first main discharge channel 461, the second main supply channel 471 and the second main discharge channel 481 are collectively referred to as "main channels". As depicted in FIG. 12, the first main supply channel 451 is located rearmost among the four main channels. As depicted in FIG. 12, five first branched supply channels 452 extend frontward from the first main supply channel 451. Note that each of the first branched supply channels 452 bends leftward at an intermediate part thereof, and then extends frontward again. As depicted in FIGS. 13C and 13D, each of the first branched supply channels 452 extends frontward as if crawling under the first main discharge channel 461. Note that an upper surface 452U of each of the first branched supply channels 452 is inclined further downward as approaching closer to the other end 452*b*. Note that an inclination angle of the upper surface 452U with respect to the horizontal plane is greater than an inclination angle of the nozzle surface of each of the line head assemblies 10 with respect to the horizontal plane which is defined in a case that the line head assemblies 10 are attached to the arch frame 41. Therefore, even in a case that the line head assemblies 10 are attached to the arch frame 41 so that each of the line head assemblies 10 is inclined with respect to the horizontal plane, the upper surface 452U of the first branched supply channel 452 is inclined further downward as approaching closer to the other end 452*b*.

<Shape of First Branched Discharge Channel 462 (Second Branched Discharge Channel 482)>

Next, the shape of the first branched discharge channel 462 will be explained, with reference to the drawings. Note that since the second branched discharge channel 482 has a shape which is symmetrical to the first branched discharge channel 462 with respect to the line X in FIG. 12, any detailed explanation for the second branched discharge channel 482 will be omitted.

As depicted in FIG. 12, the first main discharge channel 461 is located second rearmost among the four main channels. As depicted in FIG. 12, five first branched discharge channels 462 extend frontward from the first main discharge channel 461. As depicted in FIG. 13B, each of the first branched discharge channels 462 extends frontward as if crawling under the second main discharge channel 481. Note that an upper surface 462U of each of the first branched discharge channels 462 is inclined further downward as approaching closer to the other end 462*b*. Note that an inclination angle of the upper surface 462U with respect to the horizontal plane is greater than the inclination angle of the nozzle surface of each of the line head assemblies 10 with respect to the horizontal plane which is defined in a case that the line head assemblies 10 are attached to the arch frame 41. Therefore, even in a case that the line head assemblies 10 are attached to the arch frame 41 so that each of the line head assemblies 10 is inclined with respect to the horizontal plane, the upper surface 462U of each of the first branched discharge channels 462 is inclined further downward as approaching closer to the other end 462*b*.

Further, as depicted in FIG. 12, the five first branched discharge channels 462 extend rearward from the first main discharge channel 461. As depicted in FIG. 13A, each of the first branched discharge channels 462 extends rearward as if crawling under the first main supply channel 451. Note that the upper surface 462U of each of the first branched discharge channels 462 is inclined further downward as approaching closer to the other end 462*b*. Note that the inclination angle of the upper surface 462U with respect to the horizontal plane is greater than the inclination angle of the nozzle surface of each of the line head assemblies 10 with respect to the horizontal plane which is defined in a case that the line head assemblies 10 are attached to the arch frame 41. Therefore, even in a case that the line head assemblies 10 are attached to the arch frame 41 so that each of the line head assemblies 10 is inclined with respect to the horizontal plane, the upper surface 462U of each of the first branched discharge channels 462 is inclined further downward as approaching closer to the other end 462*b*.

<Connection Between Tank 400 and Heads 11>

Next, connection between the tank 400 and the heads 11 will be explained. Although not depicted in the drawings, the other end 452*b* of each of the first branched supply channels 452 and the first supply port 16 of one of the heads 11 is connected by the tube 416. Similarly, the other end 462*b* of each of the first branched discharge channels 462 and the first discharge port 17 of one of the heads 11 is connected by the tube 416. The other end 472*b* of each of the second branched supply channels 472 and the second supply port 18 of one of the heads 11 is connected by the tube 416. The other end 482*b* of each of the second branched discharge channels 482 and the second discharge port 19 of one of the heads 11 is connected by the tube 416. As described above, the other end 452*b* of each of the first branched supply channels 452, the other end 462*b* of each of the first branched discharge channels 462, the other end 472*b* of each of the second branched supply channels 472 and the other end 482*b* of each of the second branched discharge channels 482 which corresponds to one piece of the head 11 are located, respectively, at positions overlapping in the up-down direction with the first supply port 16, the first discharge port 17, the second supply port 18 and the second discharge port 19, respectively, of the head 11. With this, it is possible to provide the connection in a state that the tubes 416 are extended so as not to cross one another, which in turn allows usage of tubes 416 of a same length.

<Heater 250>

In the present embodiment, since the UV-curable ink is used, it is necessary to maintain the temperature of the ink at a predetermined temperature. Accordingly, each of the line head assemblies 10 in the present embodiment is provided with the heater 250 configured to warm or heat the ink in the inside of the tubes 416 connected to the tank 400 and the head 11. As depicted in FIG. 5, the heater 250 is provided at a position overlapping with the tubes 416 in the front-rear direction. As the heater 250, it is allowable to use, for example, a carbon heater which generates heat by supplying an electric current to a carbon sheet. Note that in order to warm the ink inside the tank 400 in advance, it is also possible to provide, for example, a sheet-shaped heater in the lower surface of the tank 400.

<Circulation of Ink>

Next, the ink circulating routes will be explained, with referenced to FIGS. 14 and 15. At first, an explanation will be given about an ink circulating route included in the ink circulating routes and corresponding to one of the two nozzle rows included in the head 11, with reference to FIG. 14. As depicted in FIG. 14, the ink reservoir 8, the first ink supply port 222*f* and the first ink discharge port 222*d* of the second casing 200 are fluidly connected via the ink circulating mechanism 80. Note that the ink circulating mechanism 80 is a publicly known ink circulating system provided with a pump, a valve, an exhaust valve, etc., and any detailed explanation therefor will be omitted. By the ink circulating mechanism 80, the ink supplied from the ink reservoir 8 flows toward the first ink supply port 222*f* of the second casing 200. Further, the ink flows from the first ink supply port 222*f* of the second casing 200 toward the first supply channel 450 of the tank 400, and passes through the tube 416 from the other end 452*b* of each of the first branched supply channels 452 of the first supply channel 450, and flows into the first supply port 16 of the head 11. A first supply manifold 14*f*, the plurality of pressure chambers 11*p*, the plurality of nozzles 11*a* and a first return manifold 14*r* are formed, as the intra-head channel, in the inside of the head 11. The first supply manifold 14*f* and the first return manifold 14*r* are provided commonly with respect to the plurality of pressure chambers 11*p*. The plurality of pressure chambers 11*p* and the plurality of nozzles 11*a* correspond to one another in one-to-one basis. The ink supplied from the first supply port 16 flows from the first supply manifold 14*f* into the plurality of pressure chambers 11*p*. In a case that the non-illustrated piezoelectric actuator is driven so as to apply a discharge pressure (ejecting pressure) to a certain pressure chamber 11*p* as one of the plurality of pressure chambers 11*p*, an ink droplet of the ink is discharged or ejected from a nozzle 11*a*, among the plurality of nozzles 11*a*, connected to the certain pressure chamber 11*p*. The ink which has not been discharged from the nozzle 11*a* is fed to the first return manifold 14*r*, passes through the first discharge port 17 and the tube 416 and flows into the first discharge channel 460 of the tank 400. The first discharge channel 460 of the tank 400 is connected to the first ink discharge port 222*d* of the second casing 200. The ink inflowed into the first discharge channel 460 passes through the first ink discharge port 222*d* and flows toward the ink reservoir 8. In such a manner, the ink can be circulated.

Next, an explanation will be given about an ink circulating route included in the ink circulating routes and corresponding to the other of the two nozzle rows included in the head 11, with reference to FIG. 15. As depicted in FIG. 15, the ink reservoir 8, the second ink supply port 223*f* and the second ink discharge port 223*d* of the second casing 200 are fluidly connected via the ink circulating mechanism 80. By the ink circulating mechanism 80, the ink supplied from the ink reservoir 8 flows toward the second ink supply port 223*f* of the second casing 200. Further, the ink flows from the second ink supply port 223*f* of the second casing 200 toward the second supply channel 470 of the tank 400, and passes through the tube 416 from the other end 472*b* of each of the second branched supply channels 472 of the second supply channel 470, and flows into the second supply port 18 of the head 11. A second supply manifold 15*f*, the plurality of pressure chambers 11*p*, the plurality of nozzles 11*a* and a second return manifold 15*r* are formed, as the intra-head channel, in the inside of the head 11. The second supply manifold 15*f* and the second return manifold 15*r* are provided commonly with respect to the plurality of pressure chambers 11*p*. The plurality of pressure chambers 11*p* and the plurality of nozzles 11*a* correspond to one another in one-to-one basis. The ink supplied from the second supply port 18 flows from the second supply manifold 15*f* into the plurality of pressure chambers 11*p*. In a case that the non-illustrated piezoelectric actuator is driven so as to apply a discharge pressure (ejecting pressure) to a certain pressure chamber 11*p* as one of the plurality of pressure chambers 11*p*, an ink droplet of the ink is discharged or ejected from a nozzle 11*a*, among the plurality of nozzles 11*a*, connected to the certain pressure chamber 11*p*. The ink which has not been discharged from the nozzle 11*a* is fed to the second return manifold 15*r*, passes through the second discharge port 19 and the tube 416 and flows into the second discharge channel 480 of the tank 400. The second discharge channel 480 of the tank 400 is connected to the second ink discharge port 223*d* of the second casing 200. The ink inflowed into the second discharge channel 480 passes through the second ink discharge port 223*d* and flows toward the ink reservoir 8. In such a manner, the ink can be circulated.

<Action and Effect of Embodiment>

Each of the line head assemblies 10 according to the present embodiment is provided with the line head 20 including the ten heads 11, and the tank 400 positioned above the line head 20. The ten heads 11 are aligned in two rows so that the five heads 11 are arranged in the left-right direction in each of the two rows. Between two heads 11, which are included in the five heads 11 and which are adjacent to each other in the left-right direction in one of the two rows, a head 11 belonging to the other of the two rows is arranged. Namely, the ten heads 11 are arranged in a staggered manner. Note that all the ten heads 11 are heads of the circulating type.

Each of the heads 11 includes the first supply port 16. The ink is supplied from the first supply channel 450 of the tank 400 with respect to the first supply port 16 of each of the ten heads 11 which are arranged in the staggered manner. Further, each of the heads 11 is provided with the first discharge port 17. The ink discharged from the first discharge port 17 of each of the ten heads 11 which are arranged in the staggered manner is returned to the first discharge channel 460 of the tank 400. By the configuration as described above, it is possible to appropriately distribute and recover the ink with respect to the line head 20 in which the heads 11 are arranged in the staggered manner.

In the present embodiment, the first supply channel 450 has the first main supply channel 451 and the ten first branched supply channel 452 branched from the first main supply channel 451. The first discharge channel 460 has the first main discharge channel 461 and the ten first branched discharge channel 462 branched from the first main discharge channel 461. Note that among the ten first branched supply channels 452, the other end 452*b* of each of the five first branched supply channels 452 is connected to the first supply port 16 of one of the five heads 11 aligned in a row in the left-right direction. Similarly, among the ten first branched supply channels 452, the other end 452*b* of each of the other five first branched supply channels 452 is connected to the first supply port 16 of one of the other five heads 11 aligned in another row in the left-right direction. Similarly, among the ten first branched discharge channels 462, the other end 462*b* of each of the five first branched discharge channels 462 is connected to the first discharge port 17 of one of the five heads 11 aligned in a row in the left-right direction. Further, among the ten first branched discharge channels 462, the other end 462*b* of each of the other five first branched discharge channels 462 is connected to the first discharge port 17 of one of the other five heads 11 aligned in another row in the left-right direction. Owing to such a configuration, it is possible to easily distribute and recover the ink by using the first branched supply channels 452 and the first branched discharge channels 462 formed in the inside of the tank 400.

In the above-described embodiment, the first branched supply channels 452 are located below the first main supply channel 451, and the first branched discharge channels 462 are located below the first main discharge channel 461. Owing to such a configuration, even in a case that any air bubble enters into the first branched supply channel 452 and the first branched discharge channel 462, it is possible to release the air bubble to the first main supply channel 451 and the first main discharge channel 461 located above the first branched supply channel 452 and the first branched discharge channel 462, respectively. With this, it is possible to avoid any generation of air accumulation in the first branched supply channel 452 and the first branched discharge channel 462, and to easily remove the air bubble from the first branched supply channel 452 and the first branched discharge channel 462.

In the embodiment, the position in the front-rear direction and the position in the left-right direction of the other end 452*b* of each of the ten first branched supply channels 452 are coincident, respectively, with the position in the front-rear direction and the position in the left-right direction of the first supply port 16 of one of the ten heads 10. Further, the position in the front-rear direction and the position in the left-right direction of the other end 462*b* of each of the ten first branched discharge channels 462 are coincident, respectively, with the position in the front-rear direction and the position in the left-right direction of the first discharge port 17 of one of the ten heads 10. Note that the phrase "the position(s) is(are) coincident with" does not mean that the position(s) is (are) strictly coincident, and rather means that the position(s) is (are) coincident within any manufacturing error and any attachment error. Owing to such a configuration, since the tank 400 and the line head 20 overlap with each other in the up-down direction, it is possible to make the footprints of the tank 400 and the line head 20 be compact, and thus to make the size of the line head assembly 10 to be small.

In the embodiment, the upper surface 452U of the first branched supply channel 452 is inclined with respect to the plane including the front-rear direction and the left-right direction. Similarly, the upper surface 462U of the first branched discharge channel 462 is also inclined with respect to the plane including the front-rear direction and the left-right direction. Owing to such a configuration, it is possible to avoid any generation of air accumulation in the first branched supply channel 452 and the first branched discharge channel 462, and to easily remove the air bubble from the first branched supply channel 452 and the first branched discharge channel 462.

In the embodiment, the ten tubes 416 connected to the other ends 452*b* of the ten first branched supply channels 452 and the first support ports 16 of the ten heads 11, respectively, are parallel to the up-down direction. Similarly, the ten tubes 416 connected to the other ends 462*b* of the ten first branched discharge channels 462 and the first discharge ports 17 of the ten heads 11, respectively, are parallel to the up-down direction. Owing to such a configuration, it is possible to avoid any accumulation of air in the inside of the tubes 416. Further, in the embodiment, these tubes 416 all have a same length. Note that the term "same length" is not intended to mean a strictly same length. It is allowable that the lengths are different within any manufacturing error. In such a case, it is possible to use tubes of a same standard, thereby making it possible to reduce the cost of manufacture.

In the embodiment, the first main supply channel 451, the first main discharge channel 461, the second main supply channel 471 and the second main discharge channel 481 are arranged in the front-rear direction; the second branched supply channels 472 branched from the second main supply channel 471, which is arranged frontmost among the above-described four main channels 451, 461, 471 and 481, extend rearward. Further, the first branched supply channels 451 branched from the first main supply channel 451, which is arranged rearmost among the above-described four main channels 451, 461, 471 and 481, extend frontward.

Furthermore, among the above-described four main channels 451, 461, 471 and 481, the first main supply channel 451 and the second main supply channel 471 are arranged outside in the front-rear direction, and the first main discharge channel 461 and the second main discharge channel 481 are arranged inside in the front-rear direction. By arranging the main channels in such a manner, it is possible to prevent occurrence of any difference in temperature between the two supply channels supplying the ink to the head 11. Note that also in a case that the first main supply channel 451 and the second main supply channel 471 are arranged inside in the front-rear direction, and the first main discharge channel 461 and the second main discharge channel 481 are arranged outside in the front-rear direction, it is possible to similarly prevent occurrence of any difference in temperature between the two supply channels supplying the ink to the head 11.

In the embodiment, the ink passing through the first main supply channel 451 flows the ten first branched supply channels 452 and flows, respectively, into the first supply ports 16 of the ten heads 11. Further, the ink discharged from the first discharge ports 17 of the ten heads 11 passes the ten first branched discharge channels 462 and flows into the first main discharge channel 461. By causing the ink to flow in the line head assembly 10 in such a manner, it is possible to easily circulate the ink.

The above-described embodiment disclosed herein is exemplary in all the points, and is not restrictive or limiting. All the respective configurations indicated in the embodiment are not essential, and any omission may be made in each of the configuration, as necessary. For example, the number, arrangement, etc., of the line head assembly 10, the number, the arrangement, etc., of the head 11 included in one piece of the line head 20 may be appropriately changed. Further, the number, arrangement, etc., of the nozzle 11*a* included in each of the heads 11 may also be appropriately changed. Furthermore, in the embodiment, although the controller 7 is provided on the printing apparatus 1, the present disclosure is not limited to or restricted by such an aspect. For example, it is allowable to provide the controller 7 on the line head assembly 10.

In the above-described embodiment, the recording medium which is wound in the roll shape (for example, rolled paper or rolled paper sheet) is used as the recording medium 4. However, the present disclosure is not limited to or restricted by such an aspect; it is allowable to use a recording medium 4 of an appropriate shape and material, as necessary. In the embodiment, the structure, shape, material, etc., of the tank 400 may be changed as appropriate. For example, in the embodiment, the tank 400 is connected to the ten heads 11. The present disclosure, however, is not limited to such an aspect. For example, it is allowable that the tank 400 is divided into three parts or portions, and that the divided three parts are connected, respectively, to four heads 11, four heads 11 and two heads 11. Further, the printing apparatus 1 of the above-described embodiment is provided with the three line head assemblies 10 and is configured to discharge the five color inks which are the white ink, cyan ink, magenta ink, yellow ink and black ink. The present disclosure is not limited to such an aspect; it is allowable that the printing apparatus 1 is configured to discharge an ink of an appropriate color. Further, in the embodiment, the UV-curable ink is used. The present disclosure, however, is not limited to such an aspect; it is allowable to use an ink different from the UV-curable ink (for example, a water-based ink, a pigment ink, etc.).

Further, the application of the present disclosure is not limited to a printing apparatus of the ink-jet system which is configured to discharge or eject an ink. Further, the present disclosure is applicable also to a printing apparatus usable in a variety of kinds of application which are different from printing of an image, etc. For example, it is possible to apply the present disclosure to a printing apparatus configured to form a conductive pattern on a surface of a substrate by discharging a conductive liquid onto the substrate. The scope of the present disclosure is intended to encompass all the changes within the scope of the claims, and the scope equivalent to the scope of the claims.

What is claimed is:

1. A line head assembly comprising:

a line head including a first head, a second head and a third head arranged in a first direction, the second head being arranged between the first head and the third head in the first direction, positions of the first head and the third head being same in a second direction crossing the first direction, and the positions of the first head and the third head in the second direction being different from a position in the second direction of the second head; and a tank located above the line head in an up-down direction crossing the first direction and the second direction, wherein each of the first head, the second head and the third head includes:

- a first intra-head channel including a first pressure chamber and a first nozzle;
- a first supply port connected to one end of the first intra-head channel; and
- a first discharge port connected to the other end of the first intra-head channel, and wherein the tank includes:

- a first supply channel formed in the tank and connected to the first supply port of the first head, the first supply port of the second head and the first supply port of the third head; and
- a first discharge channel formed in the tank and connected to the first discharge port of the first head, the first discharge port of the second head and the first discharge port of the third head.

2. The line head assembly according to claim 1, wherein the first supply channel includes a first main supply channel and first branched supply channels A, B and C, wherein the first discharge channel includes a first main discharge channel and first branched discharge channels A, B and C, wherein the first main supply channel is connected to one end of each of the first branched supply channels A, B and C, wherein the other end of the first branched supply channel A is connected to the first supply port of the first head, the other end of the first branched supply channel B is connected to the first supply port of the second head, and the other end of the first branched supply channel C is connected to the first supply port of the third head, wherein the first main discharge channel is connected to one end of each of the first branched discharge channels A, B and C, and wherein the other end of the first branched discharge channel A is connected to the first discharge port of the first head, the other end of the first branched discharge channel B is connected to the first discharge port of the second head, and the other end of the first branched discharge channel C is connected to the first discharge port of the third head.

3. The line head assembly according to claim 2, wherein in the up-down direction, the first branched supply channels A, B and C are located below the first main supply channel, and the first branched discharge channels A, B and C are located below the first main discharge channel.

4. The line head assembly according to claim 3, wherein in a plane including the first direction and the second direction, a position of the other end of the first branched supply channel A is same as a position of the first supply port of the first head, a position of the other end of the first branched supply channel B is same as a position of the first supply port of the second head, a position of the other end of the first branched supply channel C is same as a position of the first supply port of the third head, a position of the other end of the first branched discharge channel A is same as a position of the first discharge port of the first head, a position of the other end of the first branched discharge channel B is same as a position of the first discharge port of the second head, and a position of the other end of the first branched discharge channel C is same as a position of the first discharge port of the third head.

5. The line head assembly according to claim 4, wherein the first main supply channel and the first main discharge channel are parallel to the first direction and are arranged in the second direction, a part of each of the first branched supply channels A, B and C extends in the second direction, and a part of each of the first branched discharge channels A, B and C extends in the second direction.

6. The line head assembly according to claim 4, wherein the one end, of each of the first branched supply channels A, B and C, which is connected to the first main supply channel is formed of a member constructing a surface which crosses the plane including the first direction and the second direction, and which crosses the up-down direction.

7. The line head assembly according to claim 4, further comprising:

a first supply tube A connected to the other end of the first branched supply channel A and the first supply port of the first head;

a first supply tube B connected to the other end of the first branched supply channel B and the first supply port of the second head;

a first supply tube C connected to the other end of the first branched supply channel C and the first supply port of the third head;

a first discharge tube A connected to the other end of the first branched discharge channel A and the first discharge port of the first head;

a first discharge tube B connected to the other end of the first branched discharge channel B and the first discharge port of the second head; and a first discharge tube C connected to the other end of the first branched discharge channel C and the first discharge port of the third head, wherein the first supply tubes A, B and C and the first discharge tubes A, B and C are parallel to the up-down direction.

8. The line head assembly according to claim 7, wherein lengths of the first supply tubes A, B and C and lengths of the first discharge tubes A, B and C are same.

9. The line head assembly according to claim 7, wherein each of the first head, the second head and the third head includes:

a second intra-head channel including a second pressure chamber and a second nozzle;

a second supply port connected to one end of the second intra-head channel; and a second discharge port connected to the other end of the second intra-head channel, wherein the tank includes:

a second supply channel connected to the second supply port of the first head, the second supply port of the second head and the second supply port of the third head; and a second discharge channel connected to the second discharge port of the first head, the second discharge port of the second head and the second discharge port of the third head, wherein the second supply channel includes a second main supply channel and second branched supply channels A, B and C, wherein the second discharge channel has a second main discharge channel and second branched discharge channels A, B and C, wherein the second main supply channel is connected to one end of each of the second branched supply channels A, B and C, wherein the other end of the second branched supply channel A is connected to the second supply port of the first head, the other end of the second branched supply channel B is connected to the second supply port of the second head, and the other end of the second branched supply channel C is connected to the second supply port of the third head, wherein the second main discharge channel is connected to one end of each of the second branched discharge channels A, B and C, wherein the other end of the second branched discharge channel A is connected to the second discharge port of the first head, the other end of the second branched discharge channel B is connected to the second discharge port of the second head, and the other end of the second branched discharge channel C is connected to the second discharge port of the third head, wherein the line head assembly further comprises:

a second supply tube A connected to the other end of the second branched supply channel A and the second supply port of the first head;

a second supply tube B connected to the other end of the second branched supply channel B and the second supply port of the second head;

a second supply tube C connected to the other end of the second branched supply channel C and the second supply port of the third head;

a second discharge tube A connected to the other end of the second branched discharge channel A and the second discharge port of the first head;

a second discharge tube B connected to the other end of the second branched discharge channel B and the second discharge port of the second head; and a second discharge tube C connected to the other end of the second branched discharge channel C and the second discharge port of the third head, and wherein the second supply tubes A, B and C and the second discharge tubes A, B and C are arranged to be parallel to the up-down direction.

10. The line head assembly according to claim 9, wherein lengths of the second supply tubes A, B and C and lengths of the second discharge tubes A, B and C are same.

11. The line head assembly according to claim 10, wherein lengths of the first supply tubes A, B and C, lengths of the first discharge tubes A, B and C, the lengths of the second supply tubes A, B and C and the lengths of the second discharge tubes A, B and C are same.

12. The line head assembly according to claim 2, wherein each of the first head, the second head and the third head includes:

a second intra-head channel including a second pressure chamber and a second nozzle;

a second supply port connected to one end of the second intra-head channel; and a second discharge port connected to the other end of the second intra-head channel, wherein the tank includes:

a second supply channel connected to the second supply port of the first head, the second supply port of the second head and the second supply port of the third head; and a second discharge channel connected to the second discharge port of the first head, the second discharge port of the second head and the second discharge port of the third head, wherein the second supply channel includes a second main supply channel and second branched supply channels A, B and C, wherein the second discharge channel includes a second main discharge channel and second branched discharge channels A, B and C, wherein the second main supply channel is connected to one end of each of the second branched supply channels A, B and C, wherein the other end of the second branched supply channel A is connected to the second supply port of the first head, the other end of the second branched supply channel B is connected to the second supply port of the second head, and the other end of the second branched supply channel C is connected to the second supply port of the third head, wherein the second main discharge channel is connected to one end of each of the second branched discharge channels A, B and C, and wherein the other end of the second branched discharge channel A is connected to the second discharge port of the first head, the other end of the second branched discharge channel B is connected to the second discharge port of the second head, and the other end of the second branched discharge channel C is connected to the second discharge port of the third head.

13. The line head assembly according to claim 12, wherein in the up-down direction, the second branched supply channels A, B and C are located below the second main supply channel, and the second branched discharge channels A, B and C are located below the second main discharge channel.

14. The line head assembly according to claim 13, wherein in a plane including the first direction and the second direction, a position of the other end of the second branched supply channel A is same as a position of the second supply port of the first head, a position of the other end of the second branched supply channel B is same as a position of the second supply port of the second head, a position of the other end of the second branched supply channel C is same as a position of the second supply port of the third head, a position of the other end of the second branched discharge channel A is same as a position of the second discharge port of the first head, a position of the other end of the second branched discharge channel B is same as a position of the second discharge port of the second head, and a position of the other end of the second branched discharge channel C is same as a position of the second discharge port of the third head.

15. The line head assembly according to claim 14, wherein the second main supply channel and the second main discharge channel are parallel to the first direction and are arranged in the second direction, wherein a part of each of the second branched supply channels A, B and C extends in the second direction; and wherein a part of each of the second branched discharge channels A, B and C extends in the second direction.

16. The line head assembly according to claim 14, wherein the one end, of each of the second branched supply channels A, B and C, which is connected to the second main supply channel is formed of a member constructing a surface which crosses the plane including the first direction and the second direction, and which crosses the up-down direction.

17. The line head assembly according to claim 12, wherein the tank includes a body including a plurality of through hole penetrating through the body in the up-down direction, wherein the plurality of through holes forms, in the body, the first main supply channel, and the first branched supply channels A, B and C which are formed at a location below the first main supply channel, the first main discharge channel, and the first branched discharge channels A, B and C which are formed at a location below the first main discharge channel, the second main supply channel, and the second branched supply channels A, B and C which are formed at a location below the second main supply channel, and the second main discharge channel, and the second branched discharge channels A, B and C which are formed at a location below the second main discharge channel, wherein the tank further includes:

a top plate closing upper openings of the plurality of through holes; and a bottom plate closing lower openings of the plurality of through holes.

18. The line head assembly according to claim 12, wherein the first and second main supply channels and the first and second main discharge channels are arranged in the second direction, wherein a channel, which is included in the first and second branched supply channels A, B and C and the first and second branched discharge channels A, B and C and which includes the one end closest to one side in the second direction extends toward the other side in the second direction, and wherein a channel, which is included in the first and second branched supply channels A, B and C and the first and second branched discharge channels A, B and C and which has the one end closest to the other side in the second direction extends toward the one side in the second direction.

19. The line head assembly according to claim 18, wherein the first and second main supply channels are positioned at outside in the second direction so as to sandwich the first and second main discharge channels therebetween, or the first and second main discharge channels are positioned at outside in the second direction so as to sandwich the first and second main supply channels therebetween.

20. The line head assembly according to claim 1, wherein each of the first head, the second head and the third head includes:

a second intra-head channel including a second pressure chamber and a second nozzle;

a second supply port connected to one end of the second intra-head channel; and a second discharge port connected to the other end of the second intra-head channel, and the tank includes:

a second supply channel connected to the second supply port of the first head, the second supply port of the second head and the second supply port of the third head; and a second discharge channel connected to the second discharge port of the first head, the second discharge port of the second head and the second discharge port of the third head.

21. A printing apparatus comprising:

the line head assembly as defined in claim 1; and a conveyor configured to convey a recording medium with respect to a conveyance surface facing a nozzle surface provided on each of the first head, the second head and the third head.

22. A method of flowing a liquid in a line head assembly, the line head assembly including:

a line head including a first head, a second head and a third head arranged in a first direction, the second head being arranged between the first head and the third head in the first direction, positions of the first head and the third head being same in a second direction crossing the first direction, and the positions of the first head and the third head in the second direction being different from a position in the second direction of the second head; and a tank located above the line head in an up-down direction crossing the first direction and the second direction, wherein each of the first head, the second head and the third head includes:

a first intra-head channel including a first pressure chamber and a first nozzle;

a first supply port connected to one end of the first intra-head channel; and a first discharge port connected to the other end of the first intra-head channel, wherein the tank includes:

a first supply channel formed in the tank and connected to the first supply port of the first head, the first supply port of the second head and the first supply port of the third head; and a first discharge channel formed in the tank and connected to the first discharge port of the first head, the first discharge port of the second head and the first discharge port of the third head, and wherein the first supply channel includes a first main supply channel and first branched supply channels A, B and C, wherein the first discharge channel includes a first main discharge channel and first branched discharge channels A, B and C;

wherein the first main supply channel is connected to one end of each of the first branched supply channels A, B and C, wherein the other end of the first branched supply channel A is connected to the first supply port of the first head, the other end of the first branched supply channel B is connected to the first supply port of the second head, and the other end of the first branched supply channel C is connected to the first supply port of the third head;

the first main discharge channel is connected to one end of each of the first branched discharge channels A, B and C, and wherein the other end of the first branched discharge channel A is connected to the first discharge port of the first head, the other end of the first branched discharge channel B is connected to the first discharge port of the second head, and the other end of the first branched discharge channel C is connected to the first discharge port of the third head, the method comprising:

causing a first liquid to flow from the first main supply channel to the first supply port of the first head via the first branched supply channel A;

causing the first liquid to flow from the first discharge port of the first head to the first main discharge channel via the first branched discharge channel A;

causing the first liquid to flow from the first main supply channel to the first supply port of the second head via the first branched supply channel B;

causing the first liquid to flow from the first discharge port of the second head to the first main discharge channel via the first branched discharge channel B;

causing the first liquid to flow from the first main supply channel to the first supply port of the third head via the first branched supply channel C; and causing the first liquid to flow from the first discharge port of the third head to the first main discharge channel via the first branched discharge channel C.

23. The method of flowing the liquid in the line head assembly according to claim 22, wherein each of the first head, the second head and the third head includes:

a second intra-head channel including a second pressure chamber and a second nozzle;

a second supply port connected to one end of the second intra-head channel; and a second discharge port connected to the other end of the second intra-head channel, wherein the tank includes:

a second supply channel connected to the second supply port of the first head, the second supply port of the second head and the second supply port of the third head; and a second discharge channel connected to the second discharge port of the first head, the second discharge port of the second head and the second discharge port of the third head, wherein the second supply channel includes a second main supply channel and second branched supply channels A, B and C, wherein the second discharge channel has a second main discharge channel and second branched discharge channels A, B and C, wherein the second main supply channel is connected to one end of each of the second branched supply channels A, B and C, wherein the other end of the second branched supply channel A is connected to the second supply port of the first head, the other end of the second branched supply channel B is connected to the second supply port of the second head, and the other end of the second branched supply channel C is connected to the second supply port of the third head, wherein the second main discharge channel is connected to one end of each of the second branched discharge channels A, B and C, and wherein the other end of the second branched discharge channel A is connected to the second discharge port of the first head, the other end of the second branched discharge channel B is connected to the second discharge port of the second head, and the other end of the second branched discharge channel C is connected to the second discharge port of the third head, the method further comprises:

causing a second liquid to flow from the second main supply channel to the second supply port of the first head via the second branched supply channel A;

causing the second liquid to flow from the second discharge port of the first head to the second main discharge channel via the second branched discharge channel A;

causing the second liquid to flow from the second main supply channel to the second supply port of the second head via the second branched supply channel B;

causing the second liquid to flow from the second discharge port of the second head to the second main discharge channel via the second branched discharge channel B;

causing the second liquid to flow from the second main supply channel to the second supply port of the third head via the second branched supply channel C; and causing the second liquid to flow from the second discharge port of the third head to the second main discharge channel via the second branched discharge channel C.

* * * * *